United States Patent
Kassemi et al.

(10) Patent No.: US 11,727,410 B2
(45) Date of Patent: Aug. 15, 2023

(54) METHOD AND APPARATUS FOR IMPROVING SECURITY OF A COMPUTER NETWORK UTILIZING SIMPLE MAIL TRANSFER PROTOCOL (SMTP)

(71) Applicant: SWOOP IP HOLDINGS LLC, Wilmington, DE (US)

(72) Inventors: James Kassemi, Albuquerque, NM (US); Lawrence Glen Holcomb, Albuquerque, NM (US); John P. Killoran, Jr., Albuquerque, NM (US); Patrick Killoran, Jackson Heights, NY (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 0 days.

(21) Appl. No.: 16/506,848

(22) Filed: Jul. 9, 2019

(65) Prior Publication Data
US 2019/0333066 A1    Oct. 31, 2019

Related U.S. Application Data

(63) Continuation of application No. 14/695,917, filed on Apr. 24, 2015, now Pat. No. 10,346,846.
(Continued)

(51) Int. Cl.
*G06Q 10/10* (2012.01)
*G06Q 20/40* (2012.01)
(Continued)

(52) U.S. Cl.
CPC ......... *G06Q 20/405* (2013.01); *G06Q 10/107* (2013.01); *G06Q 20/3255* (2013.01); *G06Q 20/425* (2013.01)

(58) Field of Classification Search
CPC .. G06Q 20/405; G06Q 20/425; G06Q 10/107; G06Q 20/3255; G06Q 20/40;
(Continued)

(56) References Cited

U.S. PATENT DOCUMENTS

| 5,426,781 A | 6/1995 | Kaplan et al. |
| 5,664,110 A | 9/1997 | Green et al. |

(Continued)

FOREIGN PATENT DOCUMENTS

WO    2006119342    11/2006

OTHER PUBLICATIONS

"How do I make a PayPal Donation Button?" posted on Jun. 24, 2009 at http://www.ivanwalsh.com/paypal/how-do-i-make-a-paypal-donation-button.
(Continued)

*Primary Examiner* — Christopher Bridges
*Assistant Examiner* — Tony P Kanaan
(74) *Attorney, Agent, or Firm* — Volpe Koenig

(57) ABSTRACT

An email-based e-commerce system is disclosed with additional features for added security. The system may include security features for email based e-commerce providing added assurance to customers of a higher level of protection than generally required. These security features enhance the password reset function without requiring a password, generate confirmations on outside messaging systems and implement an oversight management tool for authorizing transactions. The methods and apparatus described herein may enhance security by designing a system that can confirm payments through a separate non-email based media. The e-commerce system may send alerts or requests for confirmation in a variety of media to ensure a secure payment process. The methods and apparatus described herein may expand the list of individuals that may request or
(Continued)

approve payments based on a single account registered by a single credit card holder. A single user may receive requests from registered sub-customers for payments by email.

20 Claims, 16 Drawing Sheets

Related U.S. Application Data

(60) Provisional application No. 61/983,785, filed on Apr. 24, 2014.

(51) Int. Cl.
    *G06Q 20/32*     (2012.01)
    *G06Q 20/42*     (2012.01)
    *G06Q 10/107*     (2023.01)

(58) Field of Classification Search
    CPC .... G06Q 20/10; G06Q 20/386; G06Q 20/384; G06Q 20/12; G06Q 20/3674; G06Q 30/0269; G06Q 30/0637; G06Q 30/0222; G06Q 30/0253
    See application file for complete search history.

(56) References Cited

U.S. PATENT DOCUMENTS

| | | | |
|---|---|---|---|
| 5,694,546 A | 12/1997 | Reisman | |
| 5,706,442 A | 1/1998 | Anderson et al. | |
| 5,710,887 A | 1/1998 | Chelliah et al. | |
| 5,758,328 A | 5/1998 | Giovannoli | |
| 5,793,972 A | 8/1998 | Shane | |
| 5,794,206 A | 8/1998 | Wilkinson et al. | |
| 5,799,157 A | 8/1998 | Escallon | |
| 5,809,242 A | 9/1998 | Shaw et al. | |
| 5,825,881 A | 10/1998 | Colvin, Sr. | |
| 5,826,242 A | 10/1998 | Montulli | |
| 5,826,269 A | 10/1998 | Hussey | |
| 5,838,790 A | 11/1998 | McAuliffe et al. | |
| 5,848,397 A | 12/1998 | Marsh et al. | |
| 5,855,008 A | 12/1998 | Goldhaber et al. | |
| 5,864,823 A | 1/1999 | Levitan | |
| 5,870,717 A | 2/1999 | Wiecha | |
| 5,890,138 A | 3/1999 | Godin et al. | |
| 5,897,622 A | 4/1999 | Blinn et al. | |
| 5,899,980 A | 5/1999 | Wilf et al. | |
| 5,903,878 A | 5/1999 | Talati et al. | |
| 5,905,973 A | 5/1999 | Yonezawa et al. | |
| 5,960,411 A | 9/1999 | Hartman et al. | |
| 5,970,469 A | 10/1999 | Scroggie et al. | |
| 6,101,485 A | 8/2000 | Fortenberry et al. | |
| 6,167,435 A | 12/2000 | Druckenmiller et al. | |
| 6,246,996 B1 | 6/2001 | Stein et al. | |
| 6,938,048 B1 | 8/2005 | Jilk et al. | |
| 6,954,737 B2 | 10/2005 | Kalantar et al. | |
| 6,993,559 B2 | 1/2006 | Jilk, Jr. et al. | |
| 7,533,064 B1 | 5/2009 | Boesch | |
| 7,577,587 B2 | 8/2009 | Gee | |
| 7,912,910 B2 | 3/2011 | Banerjee et al. | |
| 8,156,012 B1 | 4/2012 | Eisner et al. | |
| 8,452,880 B2* | 5/2013 | Jain | G06Q 10/107 709/219 |
| 8,538,845 B2 | 9/2013 | Liberty | |
| 8,606,703 B1 | 12/2013 | Dorsey et al. | |
| 8,725,635 B2 | 5/2014 | Klein et al. | |
| 8,762,272 B1 | 6/2014 | Cozens et al. | |
| 8,788,389 B1 | 7/2014 | Fernandes | |
| 9,124,641 B2* | 9/2015 | Baskaran | H04L 63/06 |
| 9,189,785 B2 | 11/2015 | Liberty et al. | |
| 9,208,488 B2 | 12/2015 | Liberty | |
| 9,832,148 B2* | 11/2017 | Huang | H04L 67/06 |
| 9,892,386 B2 | 2/2018 | Liberty | |
| 9,977,831 B1* | 5/2018 | Raichur | G06Q 30/0251 |
| 10,223,691 B2* | 3/2019 | Katzin | G06Q 30/0623 |
| 10,395,223 B2 | 8/2019 | Muthu et al. | |
| 10,515,345 B2* | 12/2019 | Koh | G06Q 20/4014 |
| 10,666,523 B2* | 5/2020 | Dawes | H04L 41/22 |
| 2002/0010746 A1 | 1/2002 | Jilk, Jr. et al. | |
| 2002/0065828 A1 | 5/2002 | Goodspeed | |
| 2002/0103752 A1* | 8/2002 | Berger | G06Q 20/023 705/40 |
| 2002/0120581 A1 | 8/2002 | Schiavone et al. | |
| 2002/0120692 A1* | 8/2002 | Schiavone | G06Q 10/107 709/206 |
| 2002/0157026 A1* | 10/2002 | Brown | H04L 63/0421 726/3 |
| 2002/0178360 A1 | 11/2002 | Wenocur et al. | |
| 2003/0163413 A1 | 8/2003 | Wiczkowski | |
| 2003/0217107 A1* | 11/2003 | Parry | H04N 1/32112 709/206 |
| 2004/0024655 A1* | 2/2004 | Estes | G06Q 30/0601 705/26.1 |
| 2005/0004867 A1 | 1/2005 | Spector | |
| 2005/0044003 A1 | 2/2005 | O'Keefe et al. | |
| 2005/0251460 A1 | 11/2005 | Quigley | |
| 2006/0253335 A1 | 11/2006 | Keena et al. | |
| 2007/0016613 A1 | 1/2007 | Foresti et al. | |
| 2007/0022007 A1 | 1/2007 | Lawe | |
| 2007/0255620 A1 | 11/2007 | Tumminaro et al. | |
| 2008/0184076 A1 | 7/2008 | Yamazaki et al. | |
| 2009/0006233 A1 | 1/2009 | Chemtob | |
| 2009/0254447 A1 | 10/2009 | Blades | |
| 2009/0276345 A1 | 11/2009 | Hughes | |
| 2010/0010886 A1 | 1/2010 | Flynn, Jr. | |
| 2010/0070419 A1* | 3/2010 | Vadhri | G06Q 20/326 705/44 |
| 2011/0202615 A1 | 8/2011 | Fletcher | |
| 2011/0264555 A1 | 10/2011 | Turner-Rielle | |
| 2011/0295749 A1 | 12/2011 | Scalisi | |
| 2012/0109781 A1 | 5/2012 | Felt et al. | |
| 2012/0130898 A1* | 5/2012 | Snyder | G06Q 20/425 705/44 |
| 2012/0253896 A1* | 10/2012 | Killoran, Jr. | G06Q 20/12 705/14.4 |
| 2012/0257978 A1 | 10/2012 | Jensen et al. | |
| 2012/0276868 A1 | 11/2012 | Martell | |
| 2013/0254288 A1 | 9/2013 | Harrison | |
| 2013/0275264 A1 | 10/2013 | Lindenberg | |
| 2013/0304576 A1 | 11/2013 | Berland et al. | |
| 2014/0089464 A1* | 3/2014 | Benraz | G06F 9/452 709/217 |
| 2014/0101048 A1 | 4/2014 | Gardiner et al. | |
| 2014/0108606 A1* | 4/2014 | Beadles | H04W 12/06 709/217 |
| 2014/0222624 A1* | 8/2014 | Custer | G06Q 30/0637 705/26.82 |
| 2014/0230020 A1 | 8/2014 | Mogaki | |
| 2014/0279553 A1* | 9/2014 | Kassemi | G06Q 20/382 705/66 |
| 2014/0289118 A1* | 9/2014 | Kassemi | G06Q 20/388 705/44 |
| 2014/0297537 A1* | 10/2014 | Kassemi | H04L 51/08 705/67 |
| 2014/0365376 A1 | 12/2014 | Kassemi et al. | |
| 2015/0052055 A1* | 2/2015 | Kassemi | G06Q 10/107 705/44 |
| 2015/0134431 A1* | 5/2015 | Georgoff | G06Q 30/0207 705/14.13 |
| 2015/0195227 A1* | 7/2015 | Kassemi | H04L 63/08 709/206 |
| 2015/0215310 A1* | 7/2015 | Gill | H04L 63/0838 726/5 |
| 2015/0235210 A1* | 8/2015 | Kassemi | G06Q 20/40 705/44 |
| 2015/0254647 A1 | 9/2015 | Bondensen et al. | |
| 2015/0254648 A1* | 9/2015 | Clements | G06Q 20/367 705/41 |
| 2015/0310438 A1* | 10/2015 | Kassemi | G06Q 20/10 705/44 |

(56) References Cited

U.S. PATENT DOCUMENTS

2016/0026995 A1* 1/2016 Edmiston ........... G06Q 20/3255
726/9
2016/0119307 A1 4/2016 Zollinger et al.
2019/0327197 A1* 10/2019 Rose ..................... H04L 51/216
2022/0138741 A1* 5/2022 Alt ..................... G06Q 20/3829
705/71

OTHER PUBLICATIONS

"PayPal Community Help Forum" posted on Feb. 20, 2011 at https://www.paypal-community.com/t5/Donations-and-Fundraising/website-with-diffeernt-donation-amounts/td-/198966.
"PayPal Developer—Getting Started with Donate Buttons" https://developer-paypal.com/docs/classic/paypal-payments-standard/integration-quide/donation_buttons/-Shown in Google Search to have originated in 2008.
Truxa, Ivo, MIVA® Merchant: MmPGP Secure PGP Email Merchant Notification Module, http://mivo.truxoft.com/mm0001.htm, Jan. 21, 2011, pp. 1-10.

\* cited by examiner

Figure 4

METHOD AND APPARATUS FOR IMPROVING SECURITY OF A COMPUTER NETWORK UTILIZING SIMPLE MAIL TRANSFER PROTOCOL (SMTP)

CROSS REFERENCE TO RELATED APPLICATIONS

This application is a continuation of U.S. patent application Ser. No. 14/695,917, filed Apr. 24, 2015, which claims the benefit of U.S. Provisional Application No. 61/983,785 filed Apr. 24, 2014, which are incorporated by reference as if fully set forth herein.

FIELD OF INVENTION

The present invention is related to electronic payment systems.

BACKGROUND

There are a growing number of opportunities to complete financial transactions online. The form of these transactions may display various formats and design concepts, however, the majority of these financial transactions for single customers are based on using a web page interface. A method that allows a customer to complete a financial transaction by email offers a new set of possibilities for the consumer. For an email-based financial transaction system to be considered viable, it may need to possess the same or similar security assurances as a web-based checkout. A system that exploits the particularities of email communication to build added security may be desirable in the market place. For an email financial transaction based system an additional array of security may be possible.

An email-based e-commerce system may leverage the fact that the email account is a secure place where registered members possess security and privacy in their online correspondence. Logically, this security may be extended to a function where registered customers may approve financial transactions within their email client. The security to such a customer of that system is important. Many security systems work in tandem with other forms of messaging and communication to verify and authenticate transactions. A system that adds failsafe assurances, either through approval systems or verifications in other arenas, may be beneficial to the consumer.

SUMMARY

An email-based e-commerce system is disclosed herein with additional features for added security. The system may include security features for email based e-commerce that provide added assurance to customers, for example, a higher level of protection than may be generally required. These security features may eliminate the need for a password function, generate confirmations on outside messaging systems, and implement a management oversight tool for authorizing transactions.

The methods and apparatus described herein may further use email-based confirmation of account activity that allows for a higher level of security for accounts where sensitive information is accessible.

The methods and apparatus described herein may enhance security by implementing a system that may, with dual authorization or multi-factor authentication, confirm payments through a separate non-email based media. The e-commerce system may send alerts or requests for confirmation in a variety of media to ensure a secure payment process.

The methods and apparatus described herein may expand the list of individuals that may request or approve payments based on a single account registered by a single credit card holder. A single user may receive requests from registered sub-customers for payments by email.

The methods and apparatus described herein may create a method for resetting, adjusting, and/or bypassing password authentication. This allows a payment server to authenticate a customer without requiring a password prompt while improving user experience and increasing security. In one embodiment, this may eliminate the need for a password to access the e-commerce system.

BRIEF DESCRIPTION OF THE DRAWINGS

A more detailed understanding may be had from the following description, given by way of example in conjunction with the accompanying drawings wherein:

FIG. 4 is an illustration of an account signup where a customer may register for the e-commerce system and choose security options;

DETAILED DESCRIPTION

When used herein, the term "token" may refer to a sequence of bits of data, bytes of data or string or file used to authenticate a transaction. A token may be one or multiple encrypted strings, files, passwords, cyphers or other data which may contain information used to perform or authenticate a transaction when sent to payment servers. These tokens may be encrypted using a public-private key encryption system. The vendor or a party with knowledge of the vendor's private key may generate an encrypted token. Alternatively, a payment system or e-commerce system may generate this token on behalf of the vendor.

Disclosed herein are processor-executable methods, computing systems, and related technologies for email-based transaction security.

Figure 1:
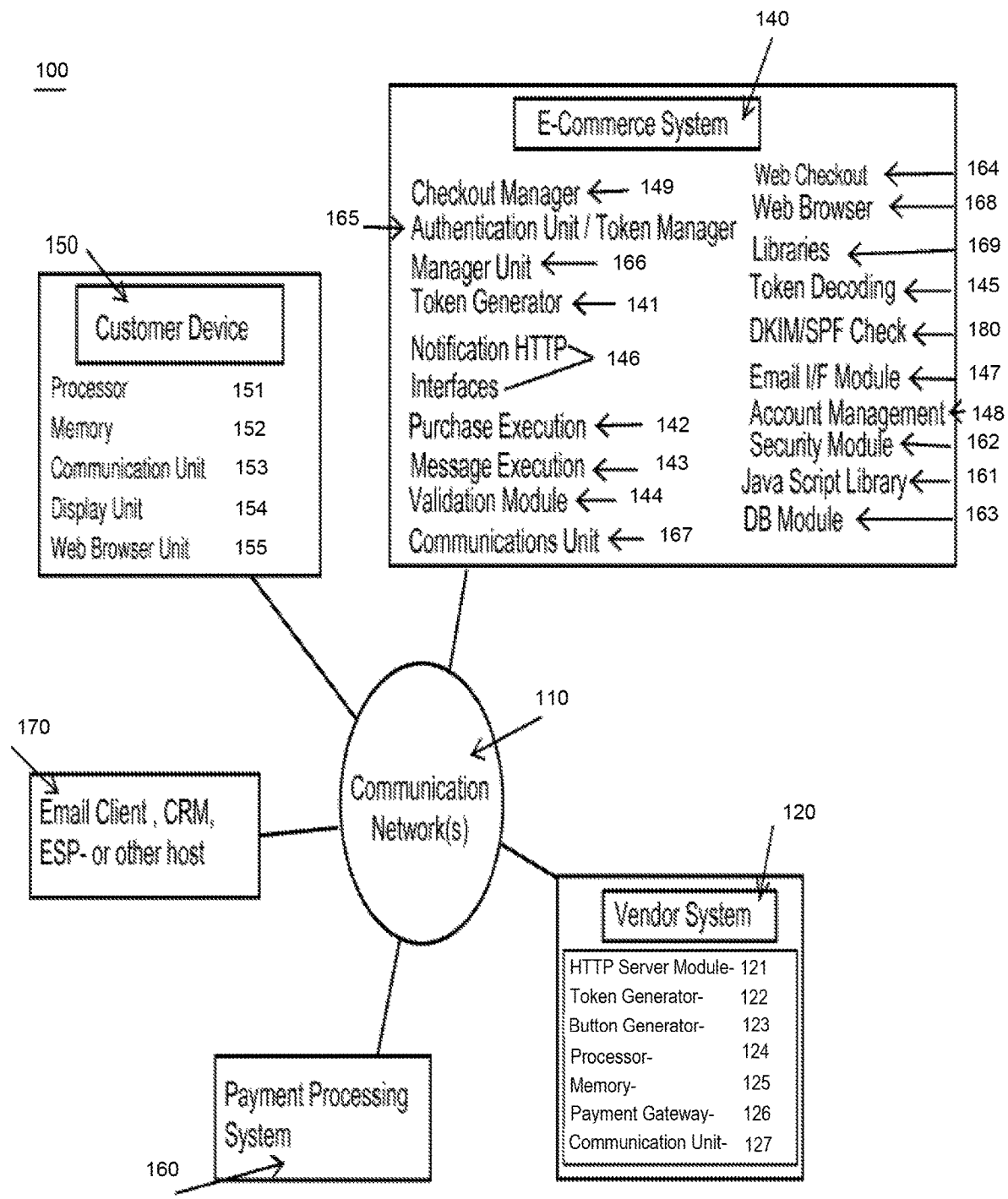
FIG. 1 shows an example system that may be used for confirmations of payments and account logon in an email-based checkout.

FIG. 1 shows an example system 100 that may be used for vendor token generation that may be used in e-commerce transactions. The example system 100 includes a customer device 150, a vendor server 120, an e-commerce system 140, a banking server (not shown), a payment processing system 160, and an email service provider 170 that may communicate over one or more wired and/or wireless communication networks 110. The wired or wireless communication networks 110 may be public, private or a combination of public or private networks.

The customer device 150 may be, for example, a cellular phone, a smartphone, a desktop computer, a laptop computer, a tablet computer, or any other appropriate computing device. The customer device 150 may utilize short message service (SMS) messages, multimedia messaging service (MMS), social media apps, web browsing, and or email. For example, social media apps may include Facebook, Twitter, GooglePlus+, LinkedIn, Instagram, Pinterest, Swapchat, Tumblr, and the like. The customer device 150 includes a processor 151, memory 152, a communications unit 153, a display unit 154 and web browser unit 155, which may communicate data to/from the web server module(s) in the vendor server 120 and payment server 140. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plug-in modules (e.g., ADOBE FLASH), and/or using one or more sub-modules within the web browser unit 155 itself. The web browser unit 155 may display data on one or more display devices (not depicted) that are included in, or connected to, the customer device 150, such as a liquid crystal display (LCD) display or monitor. The customer device 150 may receive an input from a user from an input device (not depicted) that is included in, or connected to, the customer device 150, such as a keyboard, a mouse, a microphone or a touch screen, and provide data that indicates the input to the web browser unit 155.

The vendor system 120 may include an HTTP server module 121, a token generator 122, a button generator 123, a processor 124, memory 125, a payment gateway 126 and a communications unit 127.

The HTTP server module 121 provides a website that may be accessed by a customer device 150. The HTTP server module 121 may implement the HTTP protocol, and may communicate Hypertext Markup Language (HTML) pages and related data from the website to/from the customer device 150 using HTTP. The vendor server 120 may be connected to one or more private or public networks (such as the Internet), via which the HTTP server module 121 communicates with devices such as the customer device 150. The HTTP server module 121 may generate one or more web pages, may communicate the web pages to the customer device 150, and may receive responsive information from the customer device 150.

The HTTP server module 121 may be, for example, an NGINX server, an APACHE HTTP server, a SUN-ONE Web Server, a MICROSOFT INTERNET Information Services (IIS) server, and/or may be based on any other appropriate HTTP server technology. The vendor server 120 may also include one or more additional components or modules (not depicted), such as one or more load balancers, firewall devices, routers, switches, and devices that handle power backup and data redundancy.

The payment gateway 126 may be a proprietary service that directly connects with the payment processors, such as the banking server or the payment processing system 160 to handle credit card data and authorize credit card payments.

The token generator 122 may generate tokens for use in e-commerce transactions. Tokens may be encrypted strings, which contain information to perform a transaction when sent to the e-commerce system 140. A token may be one or multiple encrypted strings, files, passwords, cyphers or other data which may contain information used to perform or authenticate a transaction. A token may include one or more parameters, for example a customer ID, vendor information, product information, and the like.

The button generator 123 may create cross-client and cross-browser compatible buttons for email checkouts. In one embodiment, the button generator 123 may include the token generator 122 to automatically generate an associated token for each button that is created.

A button and an associated token, generated by the button generator 123 and/or the token generator 122 may be embedded on a web page created by the HTTP server module 121.

The memory 125 may be configured to store information associated with e-commerce transactions. This may include inventory information, information used to generate web pages, customer information, and other e-commerce data. The e-commerce system 140 may include a token generator 141, a purchase execution module 142, a message execution module 143, a validation module 144, a database module 163, a token decoder 145, a notification HTTP module 146, an email interface module 147, an account management unit 148, checkout manager 149, web checkout 164, JAVA script library 161, a security module 162, authentication unit/token manager 165, manager unit 166, communications unit 167, web browser 168, libraries 169, and DKIM/SPF check 180. While only one vendor system 120 is shown communicating with the e-commerce system 140, this is shown as an example only. The e-commerce system 140 may communicate with an internal or external email service provider (ESP) 170 and an internal or external payment processing system 160. The e-commerce system 140 may communicate with multiple vendor systems 120.

Similarly, vendors may register with the e-commerce system 140. The e-commerce system 140 may provide the vendor system 120 with a public key and private key to be used in token transaction in accordance with the methods described herein. When a transaction is attempted (e.g. for invoices and payments), the e-commerce system 140 decodes the token, authenticates the sender of the email, which may allow the transaction to be processed. While the e-commerce system 140 is depicted as a separate entity in FIG. 1, this is shown as an example only. The e-commerce system 140 may be controlled and/or co-located with the vendor system 130, and/or the email service provider 170.

The token generator 141 may generate tokens for use in e-commerce transactions. Tokens may be encrypted or plain text strings, which contain information to perform a transaction when sent to the e-commerce system 140. A token may be one or multiple bits, bytes, encrypted strings, files, passwords, cyphers, plain text or other data which may contain information used to perform or authenticate a transaction. While FIG. 1 shows the token generator 180 as being a part of the e-commerce system 140, any trusted party may host it with access to the private key. For example, a banking server may include a token generator 141. A token may include one or more of the following parameters or other parameters not listed below:

Private-key: The private key provided by the e-commerce system 140.

Public-key: E-commerce system's 140 public key, provided by the e-commerce system 140.

Auth-key: Any additional data that may be used to authenticate the transaction, including, but not limited to, biometric identification, location data and other fraud detection systems.

Partner-id: The partner ID given provided by the e-commerce system 140.

Environment: The environment the vendor wants to generate buttons for. This distinguishes whether the token is being used in a testing environment or in the live environment (and running real transactions).

Type: The type of token to generate (e.g. bulk, email-targeted, etc.). There are multiple types of tokens that a token generator may generate and decode. For example, site tokens may be used for website transactions, email tokens for minimum-of-clicks email payments, and universal tokens for email validations.

Card: The card token associated with the recipient of this token. When a customer is registered with the e-commerce system 140, the vendor receives a credit card token—a unique identifier that references the specific card associated with that customer and vendor. When the vendor is generating a token to submit to e-commerce system 140, they may include the card token as a customer identifier.

Email: The email associated with the receipt of this token.

URL: The Signup URL the recipient may go to if customer doesn't have payment information registered with e-commerce system 140.

Amount: The amount a customer should be charged for the transaction the token is generated for.

User-data: Data to pass back as a reference. This data may include custom data that the vendor may want to pass through the e-commerce system 140 and receive back when a transaction has completed. It may include an item reference number or SKU, customer address, or other piece of data that is not required by e-commerce system 140 to complete a transaction, but that the vendor wants associated with that transaction.

Expires: Expiration date for token, integer value of seconds since epoch.

Header-user-agent: The HTTP_USER_AGENT from the request header. HTTP headers are sent as part of a request from a customer's web browser unit within customer device 150 for a piece of information. These headers define the parameters that the web browser unit is expecting to get back. The user-agent is the identifier of the software that is submitting the request—typically the identifier of the web browser unit that is requesting the content.

Header-accept-language: The HTTP_ACCEPT_LANGUAGE from the request header. The accept-language is the acceptable language for the response—e.g. the language in which the web browser unit is requesting the content be sent back.

Header-accept-charset: The HTTP_ACCEPT_CHARSET from the request header. The accept-charset is the character sets that are acceptable for the response—e.g. the character set in which the web browser unit is requesting the content be sent back.

Ip-address: The IP address of the token recipient.

In one example, a bulk token may omit the card and email fields, thereby allowing for the tokens to be shared. Additionally, or alternatively, a bulk token may include the card field and/or email field but the e-commerce system 140 may be configured to ignore those fields and/or other fields based on the type field.

The purchase execution module 142 facilitates the execution of payments between a customer and a vendor.

The message execution module 143 is configured to analyze received messages and communicate with the token decoder 145 to determine if the received message is valid and to identify the request embedded in the message (e.g. request for purchase of goods.) If the token decoder 145 indicates the token is valid, the message execution module 143 may then access the account management unit 148 to verify a transaction.

The database module 163 serves as a database to store information that may be accessed by the e-commerce system 140.

The token decoder 145 may be configured to decode tokens received from external sources, such as a vendor system 120 or a customer device 150.

The validation module 144 may serve to authenticate received emails, using the DomainKeys Identified Mail (DKIM) and/or Sender Policy Framework (SPF) protocols. For example, SPF allows a domain owner to add a file or record on the server that the recipient server cross-checks. Similarly DKIM may be used to embed information within the email. While these specific validation/authentication protocols are discussed herein, any known validation/authentication protocol may be used and the use of the DKIM/SPF protocol is used only to enhance the understanding of the reader by using a specific possible validation/authentication protocol.

Generally, SPF is an email validation system designed to detect email spoofing by providing a mechanism to allow receiving mail exchangers to check that incoming mail from a domain is being sent from a host authorized by that domain's administrators. The list of authorized sending hosts for a domain may be published in the Domain Name System (DNS) records for that domain in the form of a specially formatted TXT record. Sender Policy Framework is described in IETF publication RFC 7208, which is incorporated by reference as if fully set forth.

The Simple Mail Transfer Protocol (SMTP) permits any computer to send an email claiming to be from any source address. SPF allows the owner of an Internet domain to specify which computers are authorized to send email with sender addresses in that domain, using Domain Name System (DNS) records. Receivers verifying the SPF information in TXT records may reject messages from unauthorized sources before receiving the body of the message.

The sender address is transmitted at the beginning of the SMTP dialog. If the server rejects the sender, the unauthorized client should receive a rejection message, and if that client was a relaying message transfer agent (MTA), a bounce message to the original sending address may be generated. If the server accepts the sender, and subsequently also accepts the recipients and the body of the message, it should insert a Return-Path field in the message header in order to save the sender address.

Generally, DKIM is an email validation system designed to detect email spoofing by providing a mechanism to allow receiving mail exchangers to check that incoming mail from a domain is authorized by that domain's administrators. A digital signature included with the message may be validated by the recipient using the signer's public key published in the DNS. DKIM is the result of merging DomainKeys and Identified Internet Mail. Prominent email service providers implementing DKIM include Yahoo, Gmail, AOL and FastMail. Any mail from these organizations should carry a DKIM signature.

More specifically, both, signing and verifying modules are usually part of a mail transfer agent (MTA). The signing organization may be a direct handler of the message, such as the author, the originating sending site or an intermediary along the transit path, or an indirect handler such as an independent service that provides assistance to a direct handler. In most cases, the signing module acts on behalf of the author organization or the originating service provider by inserting a DKIM-Signature: header field. The verifying module typically acts on behalf of the receiver organization.

DKIM is independent of Simple Mail Transfer Protocol (SMTP) routing aspects in that it operates on the RFC 5322 message—the transported mail's header and body—not the SMTP envelope defined in RFC 5321. Hence, the DKIM signature survives basic relaying across multiple MTAs. DKIM allows the signer to distinguish its legitimate mail stream. This ability to distinguish legitimate mail from potentially forged mail has benefits for recipients of e-mail as well as senders, and "DKIM awareness" is programmed into some e-mail software.

The "DKIM-Signature" header field, by way of example, may include a list of "tag=value" parts. Tags are short, usually only one or two letters. The most relevant ones are b for the actual digital signature of the contents (headers and body) of the mail message, bh for the body hash, d for the signing domain, and s for the selector. The default parameters for the authentication mechanism are to use SHA-256 as the cryptographic hash and RSA as the public key encryption scheme, and encode the encrypted hash using Base64. The receiving SMTP server uses the domain name and the selector to perform a DNS lookup. For example, given the signature:

DKIM-Signature: v=1; a=rsa-sha256; d=example.net; s=brisbane;
c=relaxed/simple; q=dns/txt; l=1234; t=1117574938; x=1118006938;

-continued h=from:to:subject:date:keywords:keywords;
h=MTIzNDU2Nzg5MDEyMzQ1Njc4OTAxMjM0NTY3ODkwMTI=;
b=dzdVyOfAKCdLXdJOc9G2q8LoXSlEniSbav+yuU4zGeeruD00lszZ
VoG4ZHRNiYzR.

A verifier queries the TXT resource record type of brisbane._domainkey.example.net. The selector is a straightforward method to allow signers to add and remove keys whenever they wish—long lasting signatures for archival purposes are outside DKIM's scope. Some more tags are visible in the example:

v is the version,
a is the signing algorithm,
c is the canonicalization algorithm(s) for header and body,
q is the default query method,
l is the length of the canonicalized part of the body that has been signed,
t is the signature timestamp,
x is its expire time, and
h is the list of signed header fields, repeated for fields that occur multiple times.

The DKIM-Signature header field itself is always implicitly included in h.

The data returned from the verifier query is also a list of tag-value pairs. It includes the domain's public key, along with other key usage tokens and flags. The receiver may use this to then decrypt the hash value in the header field and at the same time recalculate the hash value for the mail message (headers and body) that was received. If the two values match, this cryptographically proves that the mail was signed by the indicated domain and has not been tampered with in transit.

Signature verification failure does not force rejection of the message. Instead, the precise reasons why the authenticity of the message may not be proven should be made available to downstream and upstream processes. Methods for doing so may include sending back a message, or adding an Authentication-Results header field to the message as described in RFC 7001, which is incorporated as if fully set forth.

While DKIM and SPF protocols are discussed herein, validation module 144 may perform any authentication and validation type protocols. DKIM and SPF are used to provide examples of such validation protocols that may be performed in validation module 144.

The notification HTTP module 146 delivers notices of events to external systems, such as an HTTP endpoint the vendor configures to update their internal database when a transaction is executed.

An email interface module 147 may be configured to parse emails for action by the e-commerce system 140.

The account management unit 148 is configured to manage accounts registered with the e-commerce system 140. A customer or vendor, wishing to complete a transaction with an e-commerce system 140 may register his/her email address and payment information with the e-commerce system 140. The account management unit 148 may be configured to store a customer registry and a vendor registry.

The security module 162 may be configured to perform additional security measures to prevent unauthorized access to the system or fraud.

The email service provider 170 may be associated with the vendor system 120, the e-commerce system 140, or may be a third party entity. The email service provider 170 may be configured to provide email marketing services. The email service provider 170 may further be configured to provide tracking information showing the status of email sent to each member of an address list. The email service provider 170 may further be configured to segment an address list into different interest groups or categories to send targeted information. The email service provider 170 may also parse messages based on the secondary system of email-targeted tokens. The email service provider 170 may also be configured to send trigger emails based on responses from the vendor system 120 or customer behavior. The email service provider 170 may further be configured to create or use templates generated by the e-commerce system 140. The templates may be used for sending information to contacts. Email service provider 170 may include a customer interface that allows a customer to adjust the template or it may be integrated with external sources (e.g. vendor system 120 or e-commerce system 140). The email service provider 170 may comprise a send engine (not shown), which allows vendors to distribute their message that may be received by one or more customer device(s) 150. The email service provider 170 may further include a tool for generating mailto links, graphic buttons, and tokens. The email service provider 170 may be configured to dynamically customize the content of emails that are sent out, to tailor personalized information and mailto links.

The banking server (not shown) may be controlled by a third party system bank. The e-commerce system 140 may communicate with the banking server to verify that the customer has adequate funds or credit for the requested payment. For example, the banking server may be a controlled by VISA, AMERICAN EXPRESS, MASTERCARD or any other banking or financial network that a customer may use for online payment. The banking server may be an automatic clearing house services (ACS). The banking server may be an interface for a centralized or decentralized virtual currency system or protocol such as frequent flyer miles, "reward" points, or Bitcoin.

The email-based e-commerce system 140 may allow vendors to send advertising emails or bills with a mailto link associated with a specific product offer (or payment amount) and select the mailto link and generate a response email by selecting the mailto link. This response email contains a token and is addressed to the e-commerce system 140. Once sent, this response email confirms the customer's payment for the product (or prepayment of a bill) by parsing the information in the token. The e-commerce system 140 processes the payment and notifies the vendor system 120 and the customer device 150. The e-commerce system 140 may comprise a token generator 141 as well as components for processing the tokens and components for processing the payments and a system for notifying the vendor system 120 of the transaction details.

The functionality of the offer, mailto link, and response email is described in U.S. patent application Ser. No. 14/324,807 filed Jul. 7, 2014 entitled EMAIL-BASED E-COMMERCE, which issued on Oct. 6, 2015 as U.S. Pat. No. 9,152,980, which is a continuation of U.S. patent application Ser. No. 13/074,222 filed Mar. 29, 2011, which issued on Jul. 8, 2014 as U.S. Pat. No. 8,775,263 entitled SYSTEM AND METHOD FOR EMAIL-BASED E-COMMERCE, and U.S. patent application Ser. No. 13/074,235 filed Mar. 29, 2011 entitled EMAIL-BASED DONATIONS, which issued on Jun. 16, 2015 as U.S. Pat. No. 9,058,591, which applications are incorporated by reference as if fully set forth.

Referring back to the example system in FIG. 1, the payment processing system 160 may be an independent third party operated unit, it may be located in the e-commerce system 140 or the vendor system 120.

While the example system shown in FIG. 1 shows the e-commerce system 140 comprising the token generator 141, this is shown as an example only. The vendor system 120 may also include a token generator that allows vendors to directly create tokens. In another example, a third party may have a token generator to create tokens for use by the vendor system 120.

System 100 may not require the vendor system 120 to host the token generator 141 on their system. System 100 uses the web browser's ability to transmit a message securely between two frames of a page and validating the URLs of those two pages.

Mailto links in the email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a "blind" copy of the new message should be sent; a field that indicates the subject of the new message; and a field that indicates the body of the new message. The mailto links may be defined according to the format described in Internet Engineering Task Force (IETF) RFC2368, which is incorporated by reference as if fully set forth herein.

The e-commerce system 140 may include a database of registered customers, such as for payment processing. The e-commerce system 140 may identify a customer by their email address and may decode tokens included in the content of an email and process payments based on the data in the token. A vendor that is associated with the e-commerce system 140 may send emails with the tokens generated for processing by the e-commerce system 140. When generating tokens, a related URL checkout page with a matching offer is generated. This allows vendors via vendor system 120 to send emails with payment options, including payments for product offers, donations, services and gift cards, for example, with each offer associated with a token and a URL checkout page. The token is associated with a mailto link. A customer may activate the mailto link by selecting (or "clicking on") the link and send the message to the e-commerce system 140. The e-commerce system 140 may then identify the email address and decode the token. If the e-commerce system 140 determines that the email address is not registered in the database, the e-commerce system 140 sends an email back to the customer with a URL link that is a checkout. This checkout is prepopulated based on the customer's mailto link selection based on the content of the token. The URL captures the payment information and registry information. The e-commerce system 140 updates the database once the new customer is registered. In future transactions, the email address of the customer is identified as registered by the e-commerce system 140 and the payment is processed exclusively through an email payment gateway.

An email-based e-commerce system 100, as described herein, allows an email payment opportunity. This may include an email advertisement offering a product or service which is sent to customers and contains the mailto links. Each mailto link may relate to an item (e.g. service or product). If the mailto link is selected by a customer, an email message associated with an item or items is generated.

Within that generated email message is a token that includes encoded information such as the purchase amount, the merchant, or an item identifier. The information contained in the token includes details for both the completion of email transaction and details that provide context and direction for the process of completing a transaction when the details included within the token are not sufficient. This may include details about the composition of a page to collect more information from the customer (where the required fields and information about those fields are stored directly in the token), a pointer to a location where the composition of a page to collect more information is stored (where the required fields and information about these fields are indirectly referenced by data in this token for retrieval at a later time), or a pointer or description of a routine to execute in case of failures (e.g. a response email in the case of product unavailability). This mailto link may be generated by a vendor through a web interface tool, or by using the e-commerce system 100 to programmatically create either the token or the full mailto link.

For a customer to complete an email transaction, the customer's payment information may be contained in the email e-commerce system database 163. In order to determine if the customer's payment information is in database 163 the token may be decoded to recognize the customer when the email arrives at the e-commerce system 140. The vendor sends the first email via the vendor system 120. The customer via customer device 150 responds by activating a mailto link by sending the response to the e-commerce system 140. If the customer is registered and the incoming email is authenticated, when the token is decoded, the transaction is processed.

If the customer is not registered, a web checkout page may be needed. Additional information may be encoded within the email token that describes a web checkout page for the email offer. The vendor's email may thereby serve multiple purposes. One enables the email to perform as an email payment, if the customer is registered, and another enables the unregistered customer to be sent a web checkout 164. The web checkout 164 may be prepopulated with additional information based on the customers' original selection that is decoded from the token. The additional information included within the token identifies remote resources, which may include an input display and validation components. The remote resource may function as a plugin, as a reference to information stored in a database, or as a hook into the execution of an independent function.

When the web checkout 164 page is being loaded by the customer, the input display may provide the requirements for displaying the field on the form, including field name, entry box length, and other properties of the input field.

When the form has been filled out by the customer and is submitted, these form fields are sent to the validation resource to confirm that the information entered meets the formatting, length, data type, and any other requirements of the field. If validation resource returns a "pass" condition for the form, submission continues to the e-commerce system 140. If the validation resource returns a "fail" condition for any data on the form, error messaging may be displayed to the customer, to enable correction of the input and resubmission again.

These remote resources may be created to describe standard information that may be used across numerous merchants, or they may be used to define custom information that may be used for a single merchant.

Using this system 100, a vendor via vender system 120 may not be required to expend additional computer programming effort because it relies on the email e-commerce system 140. If the offer web page is linked to the email purchase opportunity, the vendor may not be required to modify any existing systems or processes to register customers with the email e-commerce system 140. The vendor may not need to segment their email lists into registered and unregistered customers and the customers are not aware of the distinction within the content of the email. The distinction between customers occurs by virtue of the system relieving both the vendor and the customer of any excess choices or distinctions. The vendor may create offers manually via a web interface, and the email e-commerce system 140 may handle the aspects of the transaction, from receiving the order request, facilitating the payment processing, storing relevant transaction data, sending a receipt, and displaying transaction data to the vendor.

The vendor may integrate directly with an API. The vendor may maintain existing payment flows separate from their email e-commerce solution, or the vendor may use the email e-commerce system as a full-featured payment system for both web and email transactions without doing any software development. Presenting the customer with a clear process that seamlessly migrates the customer to adopt an email-based checkout process eases the customer into a new technology where transactions happen by email instead of on a URL. This system 100 provides a vendor with a more automated or customized way of handling elements that may be achieved through the use of the email e-commerce system 140.

The examples described herein may be described in reference to a system of email based financial transactions; however, other similar technologies may be used. Registered customers of an email e-commerce system (e.g., @Pay) may receive email advertisements that include one or many mailto hyperlinks that are associated with products, services or dollar amounts. If selected, the mailto hyperlink generates an email possessing a token associated with the specific product, service, or dollar amount named in the advertising email. By sending the email the customer is authorizing the payment. The email e-commerce system identifies the user and parses the data in the response email. The email e-commerce system processes the payment and the vendor fulfills the order. Individuals wishing to use the email payment gateway may register with the email e-commerce system initially giving an email address, but not necessarily a password. The e-commerce system may be configured to manage the account registrations and authentication tokens associated with those members.

The e-commerce system allows customers to approve payments to vendors by sending response emails to the e-commerce system for authentication and decoding. The methods described herein deal with added security confirmations that confirm payments or other actions that aid in granting access to secure information. The method disclosed herein requires a configuration of the e-commerce system where the e-commerce system generates tokens for the purposes of security and processes those tokens when they are handed back to the e-commerce system. The e-commerce system recognizes the customer and the purpose of the token using a presale hook to look up required information and then triggers the appropriate actions such as sending out additional approvals on payments or authentication links or logon codes.

Figure 2:
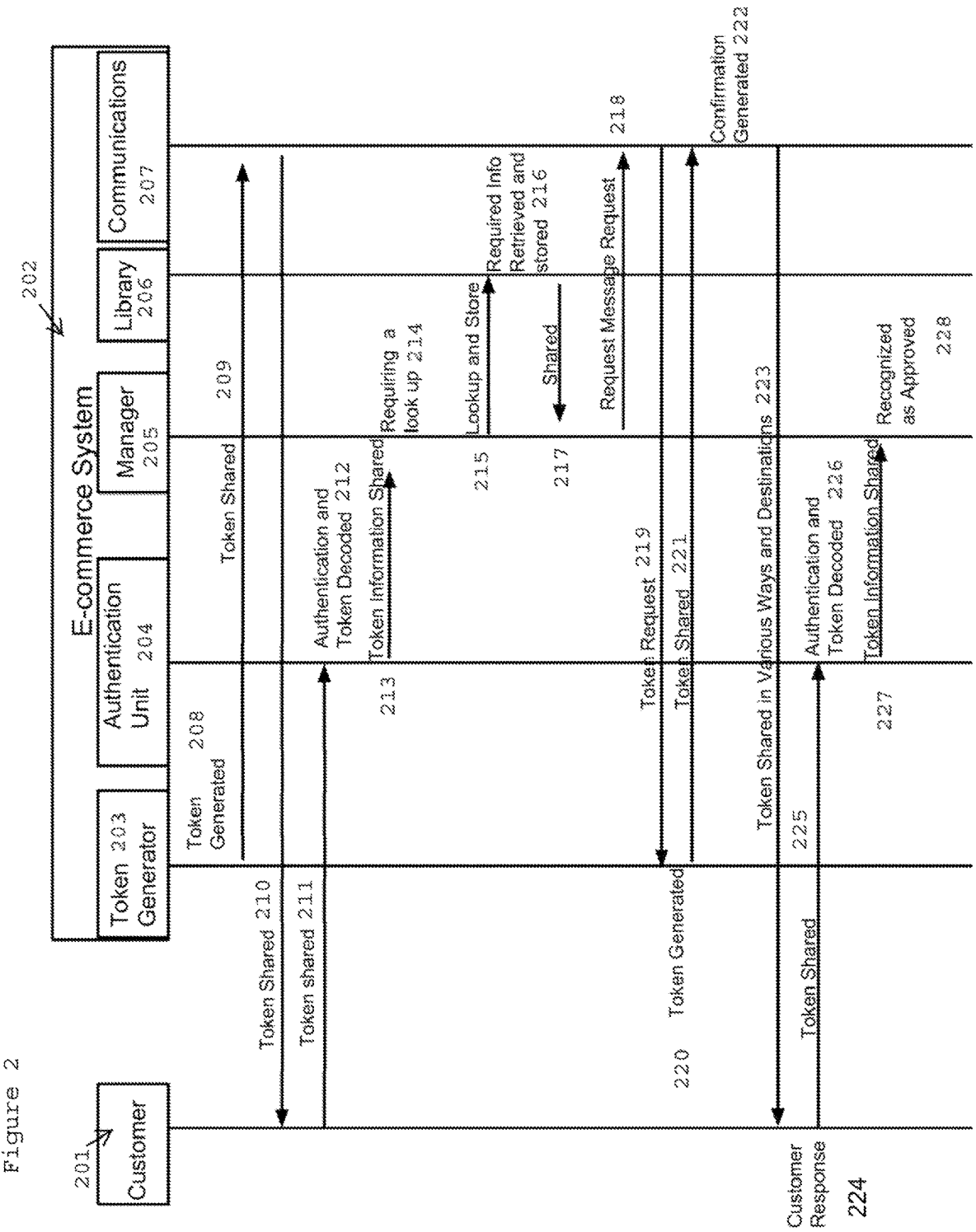
FIG. 2 is a transactional flow diagram that describes the process for authenticating a user for the e-commerce system which may be applied to confirmations and account logon.

FIG. 2 illustrates is a transactional flow diagram describing the process where the e-commerce system may process a token and look up information for the purposes of security confirmations. A token may be an encrypted string of data or simply a word or code known to the customer 201 and the e-commerce system 202 and may utilize various formats of messaging. The e-commerce system 202 may generate a token (208) at a token generator 203 based on a request and the e-commerce system's communication unit 207 may share the token (210) with the customer 201 (or more than one customer or vendors). The customer 201 may share the token (211) with the e-commerce system's authentication unit 204 and the e-commerce system may authenticate the messages and decode the token (212). The e-commerce system's authentication unit 204 may share this information (213) with the manager unit 205.

Based on the decoded information and the origin of the message (214), the manager unit 205 may request a presale hook and looks up information (215) in the e-commerce library 206. Based on the look up (216/217), the management unit 205 may request the generation of alternative confirmation messaging (218) from the communications unit 207. The communications unit 207 may request a token (219) from the token generator 203. The token generator 203 may generate at least one token (220). Alternatively, the token may only be a word or code. For example, the word may be can, yes, no, or the like. The token is shared (221) with the communications unit 207 and the confirmation message is generated (222). The communications unit 207 may share this message and token in a variety of ways (223) with the customer 201. The customer 201 may respond using the customer device (224) by sharing the token (225) with the e-commerce system's authentication unit 204. The e-commerce system's authentication unit 204 may receive the response message with the token and perform an authentication and decode the token (225). The information from the token may be shared (227) with the manager unit 205. The manager unit 205 may recognize the information and determine the required action to be taken (228). There may be another presale look up before confirmation if required. Examples of this next action may be payment processing, confirmations or the generating of logon URL.

Three formats of security may be disclosed herein. In a first example, a password protected email client managed by the host of the email client, a password protected customer account page hosted by the e-commerce system and the security provided by the credit card company relating to the card may be used. The customer account page is where the customer may make changes to the account, for example billing information. In order to achieve this, a credit card security code may be required. In order to use the services of the e-commerce system, the customer account page requires a password, but to use the email based payment approvals only the password to the email client is required for repeated use with a registered vendor. In a second example, the customer account page may not require a password, but may split the security between the email client and the credit card company. Eliminating the need for a password to access the customer account page represents a great convenience to the customer. This may require the customer to re-submit part or all of the credit card information with each update of the account page. In a third example, additional approvals and confirmations may be required before being granted to secure information or making payments. Additional security may be provided by adding approvals and confirmations to transaction requests (response emails) and customer account page logon. Secondary sources may be other customers or other media and require the use of a pre-sale hook. This allows for greater security but without the burden of remembering a password. The e-commerce system may structure tiers of security rather than a single password based tier. This mitigates damage if one tier is compromised.

The email based e-commerce system is designed to generate tokens for payment request emails which may be sent to registered customers. The email based e-commerce system may authenticate and decode those tokens when they are sent to the e-commerce system. The e-commerce system may be configured to accept payment request emails that have varied levels of authority to approve a payment.

A "full-customer" is the holder of the credit card or bank account and a customer registered with the e-commerce system that has full authority to approve a payment with the e-commerce system. A "sub-customer" is a customer that is registered by the full-customer with the e-commerce system that may request a payment and must be approved by the full-customer. The status of the sub-customer is assigned by the full-customer when the full-customer registers with the e-commerce system or when the full-customer makes changes to their account on their account page.

Figure 3:
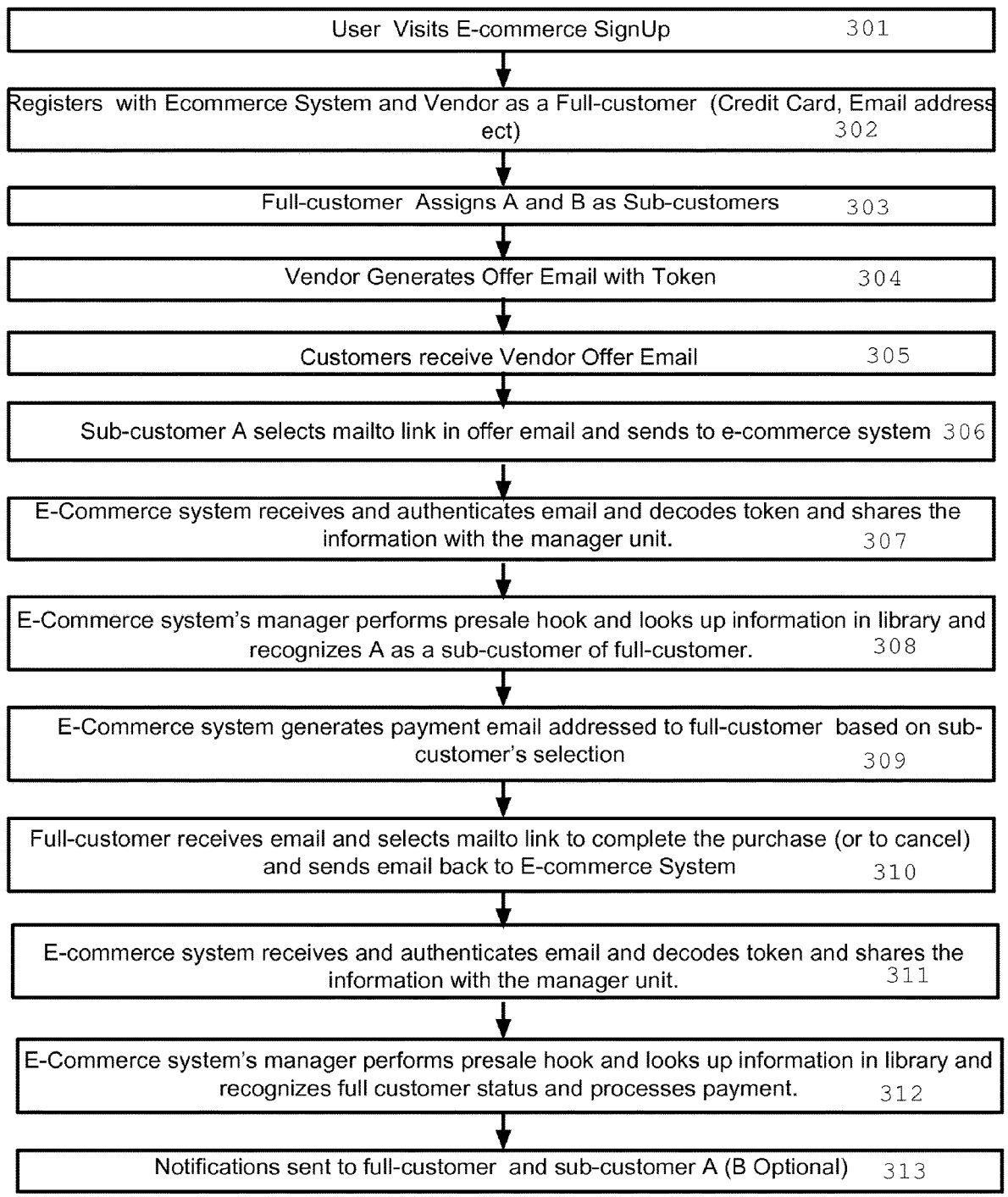
FIG. 3 is a diagram showing the steps to the signup of a full-customer and a payment request made by a sub-customer and the subsequent approval of a full-customer.

FIG. 3 is a diagram showing the steps from the registration of a full-customer to the successful oversight of a request for payment processing by a sub-customer A. By visiting a web URL sign up page (301) the customer may register with the e-commerce system (302). The customer may provide an email address and credit card information among other possible information. As the authorized holder of the credit card and/or banking account and email address the customer is registered with the e-commerce system as a full-customer.

Figure 4:
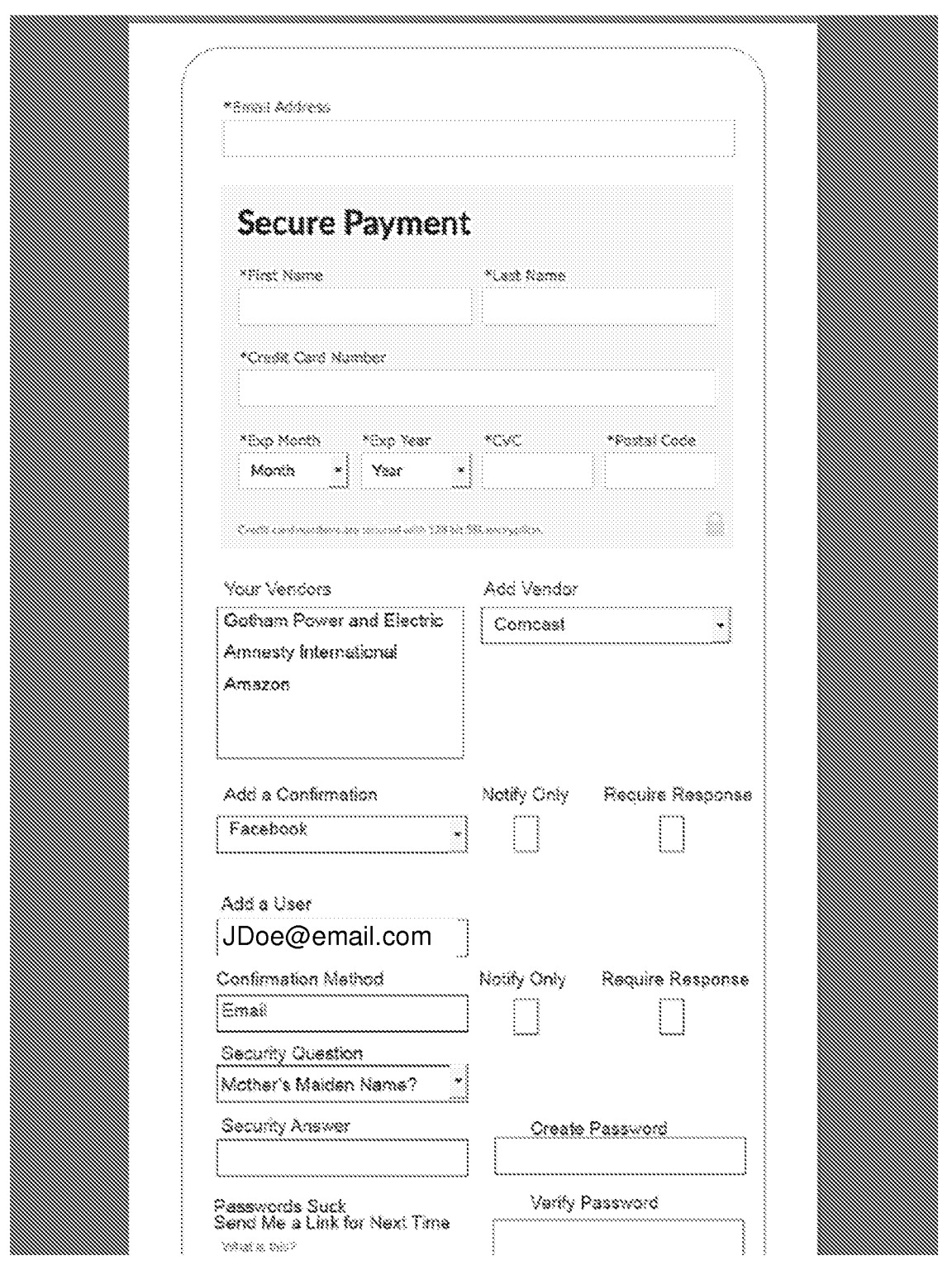

FIG. 4 is one possible example of this interface. The full-customer may assign A and B as sub-customers (303). Sub-customers may only require an email address. There may be any number of sub-customers and any number of full customers. Full-customers associate their accounts with specific vendors. Vendors use tokens generated by the e-commerce system in email messages (304). In this example, all the customers receive the payment emails (305). Sub-customer A selects mailto link in the payment email, generates a response email addressed to the e-commerce system and containing the token, and sends to e-commerce system (306). The e-commerce system receives and authenticates the email, decodes the token, and shares the information with the manager unit (307). The e-commerce system may perform other checks. The e-commerce system's manager unit performs presale hook and looks up information in the library and recognizes sub-customer A as a sub-customer of the full-customer (308). The e-commerce system generates a payment email addressed to the full-customer based on the sub-customer's selection (309). This email includes a token generated by the e-commerce system and embedded in a mailto link.

Figure 5:
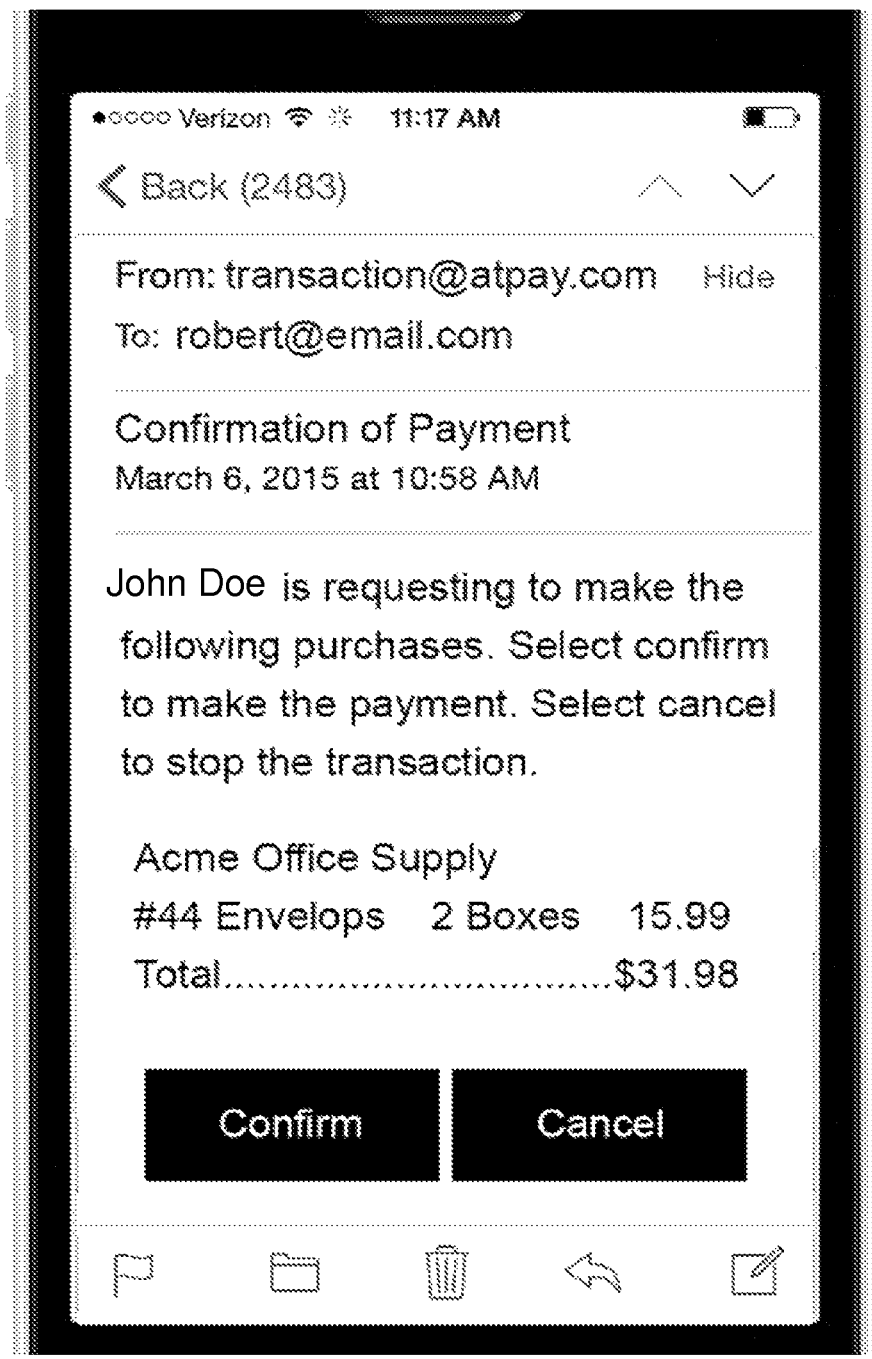
FIG. 5 is an illustration of a payment approval email sent to the full-customer.

FIG. 5 is an example of a payment email sent to a full-customer for approval. This email may also have text or images explaining that it is a request from sub-customer A and either needs to be approved or canceled. More than one option may be given to the full-customer, for example, approve, cancel or contact manager. The full-customer receives the email and selects mailto link to complete the purchase (or to cancel); generating a response email addressed to the e-commerce system with the token (310). The full-customer sends the email back to the e-commerce system. The e-commerce system receives and authenticates the email and decodes the token; sharing the information with the manager unit (311). The e-commerce system may perform other checks. The e-commerce system's manager unit performs presale hook and looks up information in the library and recognizes the status full-customer status and processes the payment (312). The e-commerce system's manager unit may alternatively cancel the payment based on the request. Notifications may be sent to full-customer and sub-customers (313).

Figure 6:
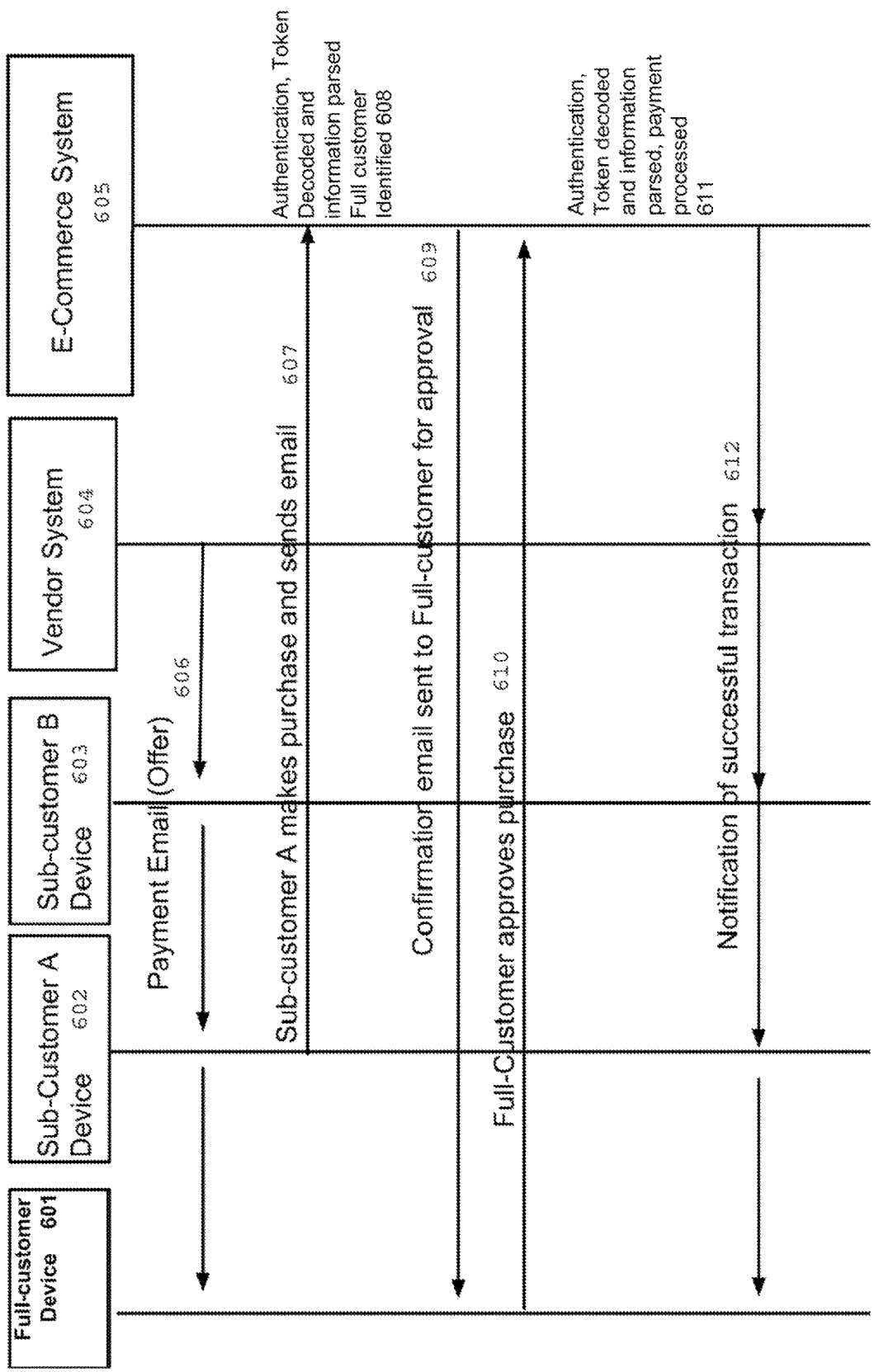
FIG. 6 is a transactional flow diagram that describes the process where one of multiple sub-customers might request transactions with full-customer oversight and approval.

FIG. 6 describes this process in a transactional flow diagram beginning at the point where the vendor sends the payment emails. Sub-customer B 603 is depicted in the diagram to illustrate a party that may receive payment emails and notifications but choose not to interact. The vendor system 604 may transmit a payment email (offer) (606) to a full customer 601. In response to the payment email (offer), sub-customer A 602 may make a purchase and send an email (607) to the e-commerce system 605. The e-commerce system 605 may authenticate the email, decode the token, and parse the information to identify the full customer (608). The e-commerce system 605 may send a confirmation email (609) to the full customer 601 for approval. The full customer 601 may send a response to the e-commerce system 605 to approve the purchase (610). The e-commerce system 605 may authenticate the email, decode the token, parse the information, and process the payment (611). The e-commerce system 605 may send a notification of successful transaction (612) to the full customer 601.

FIG. 6 is a transactional flow diagram that describes the process where multiple sub-customers might approve transactions with full-customer oversight and approval. Based on the full-customer's preference the system may allow all of the recipients to approve a purchase or may require that a series of email permissions occur before the transaction is processed. This predetermined sequence of approvals may be sent one after another or all the emails may be sent at the same time. Once all the approvals are parsed by the e-commerce system then the payment is processed. Update emails are sent to the group that state who made initial purchases and who approved those purchases. If the manager unit does not approve a purchase, the e-commerce system may cancel the order and send a message to the original Sub-Customer stating that the transaction was canceled by the full-customer.

Figure 7:
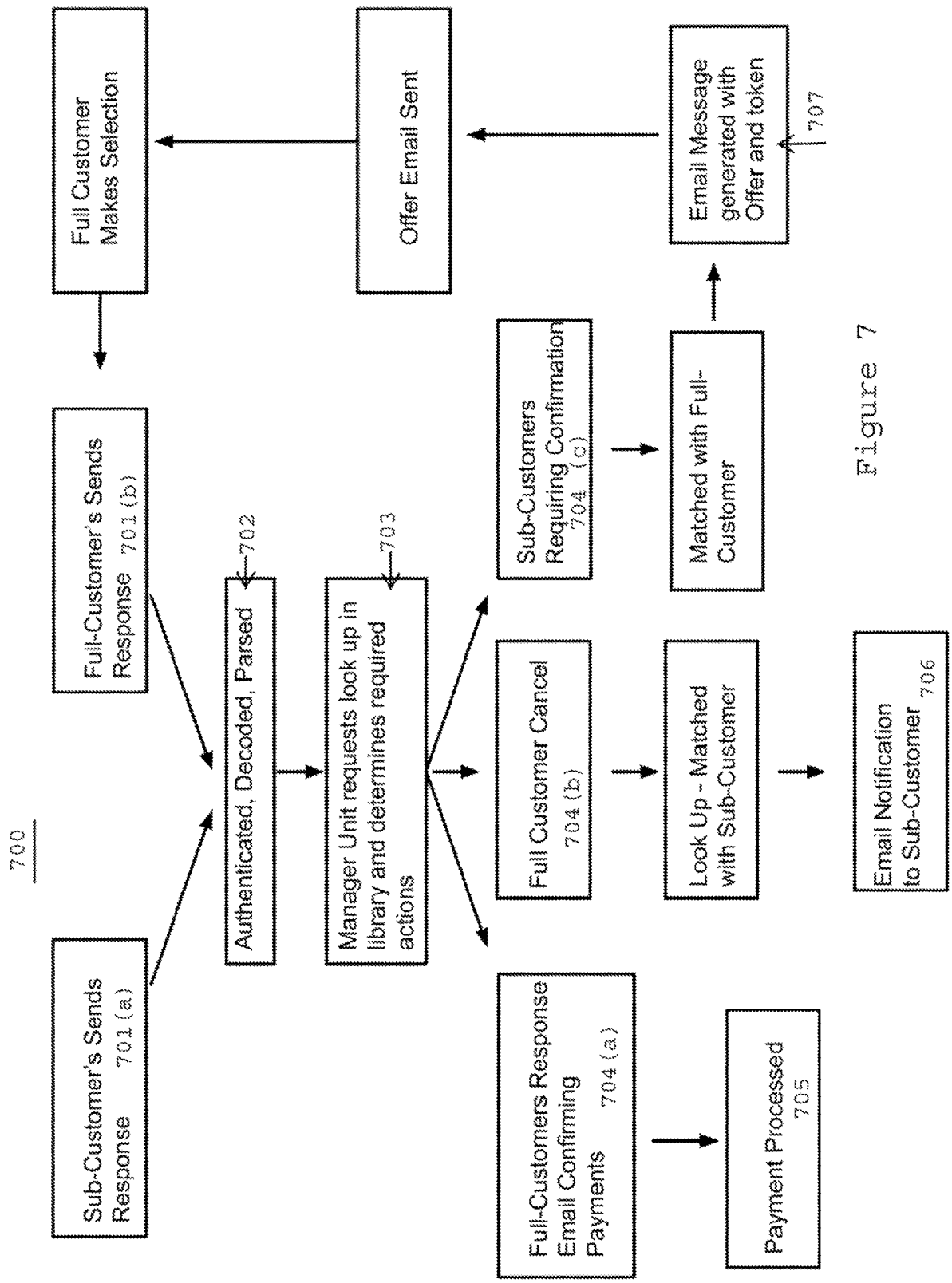
FIG. 7 is a diagram that illustrates the e-commerce system and its parsing function in approval of email transactions distinguishing between full-customers and sub-customer status.

FIG. 7 illustrates the e-commerce system and its parsing function in approval of email transactions. The e-commerce system 700 may receive emails (701(*a*) and 701(*b*)) and authenticate and decode tokens (702). The e-commerce system 700 may parse separates into categories of each messages function (702). The manager unit may request look up in the library unit and determine the required action 703. For example, the categories may be sub-customers requiring confirmation of full-customers (704(*c*)), full-customers canceling orders (704(*b*)) and full-customers' response emails confirming payments originally requested by sub-customers (704(*a*)). These categories may be any number of functions, for example, emails that are not registered may be sent to a signup page, which is not depicted on this diagram. FIG. 7 illustrates that the e-commerce system 700 may parse emails based on full-customer and sub-customer status and requirements. The e-commerce system 700 may process payments (705) and generate notifications based on full-customer registration (706) and generate payment emails triggered by requests from sub-customers (707). Using several methods, fully described in FIG. 2, the e-commerce system 700 may recognize the status of as either full-customer or sub-customer. This distinction may be made by associating email addresses in one of the categories, by including this distinction in the token, based on the email destination or assigned vendor relationship among others, or any combination of these and looking up requirements in the e-commerce system's library. Although the disclosed example describes a single full-customer, a number of full-customers may be named as well as any number of sub-customers.

FIG. 4 describes a configuration of the email-based e-commerce system that allows for further security functionality. The e-commerce system may include an additional confirmation message, which is sent via a different format such as short message service (SMS), multimedia messaging service (MMS) or social media to the customer. An additional layer of protection may be implemented against unauthorized transactions and adds another layer of security beyond the email client. It allows for there to be a secondary network so the customer is aware of financial activity of the email client. A customer registers with the e-commerce system to approve payments through email response messages. FIG. 4 is an example of that sign up and where the customer may add a confirmation process in an alternative media such as SMS or social media networks. Although this may be used when the email account of the customer is compromised it may also be used if there is a mistake in the amount or a misunderstanding of the original advertising email.

Figure 8:
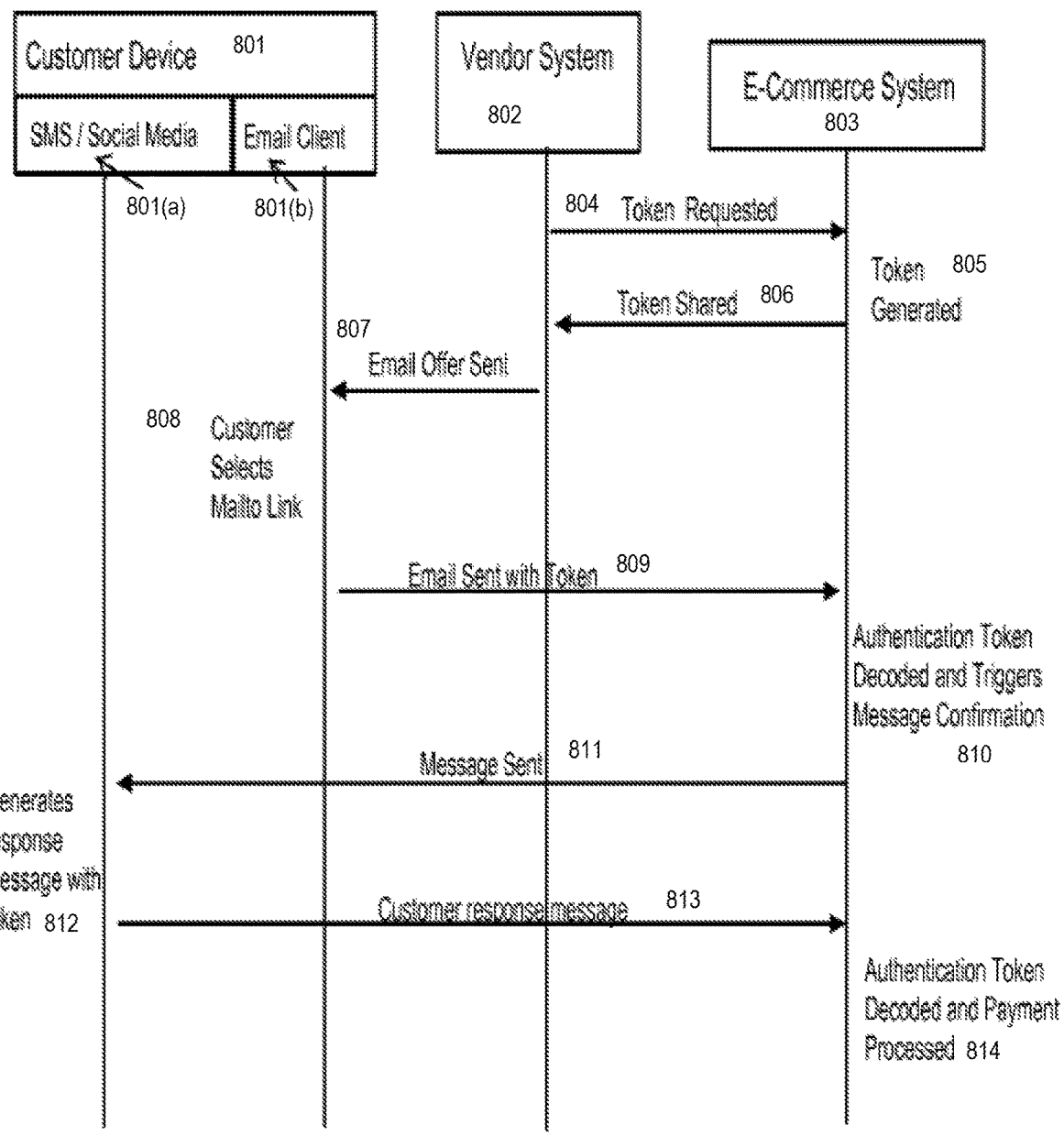
FIG. 8 is a transactional flow diagram that describes the process for using text messages and or social media as a confirmation of purchases by email.
Figure 9:
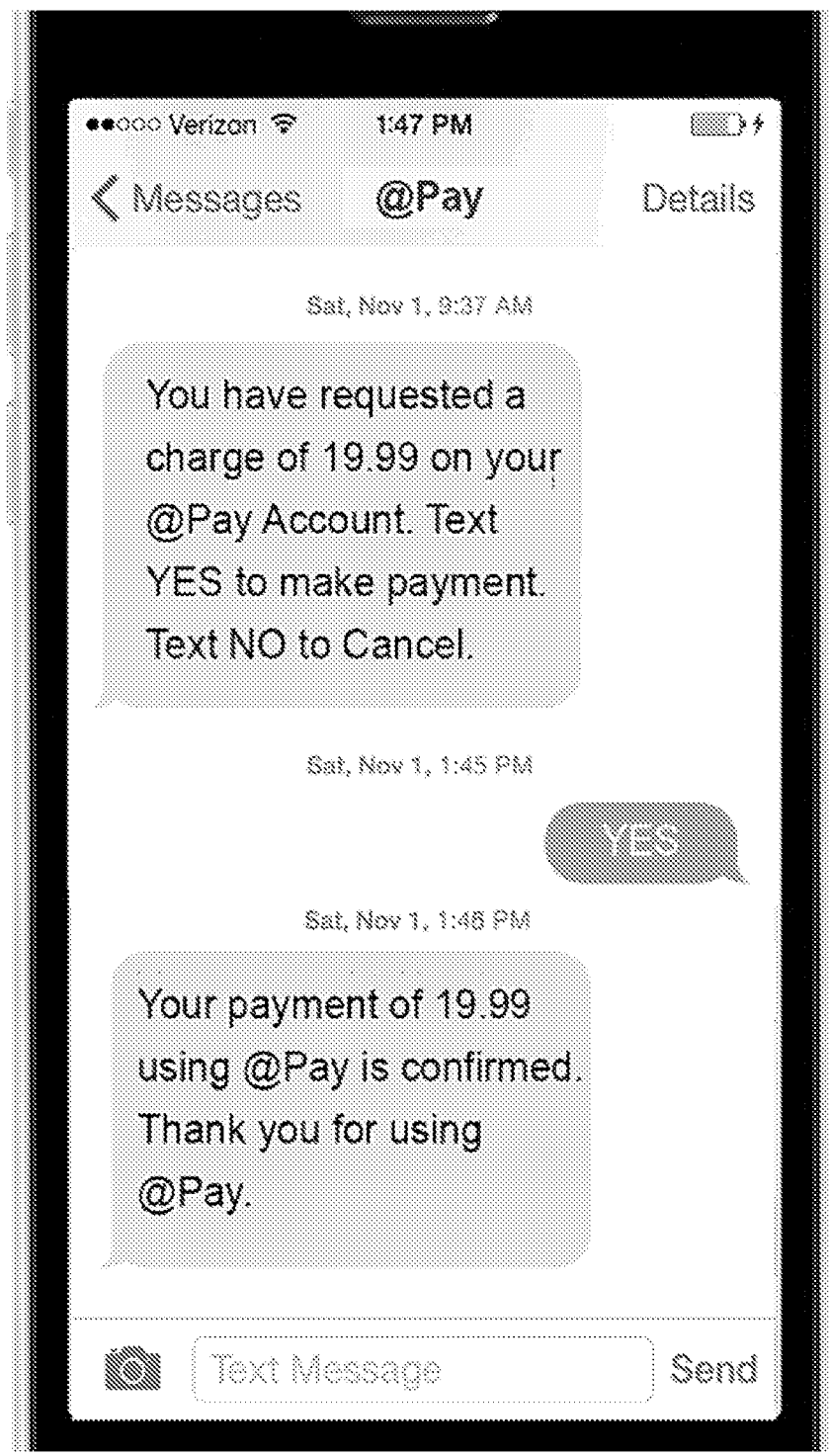
FIG. 9 is an illustration of an example of a text message confirmation on a customer mobile device.
Figure 10:
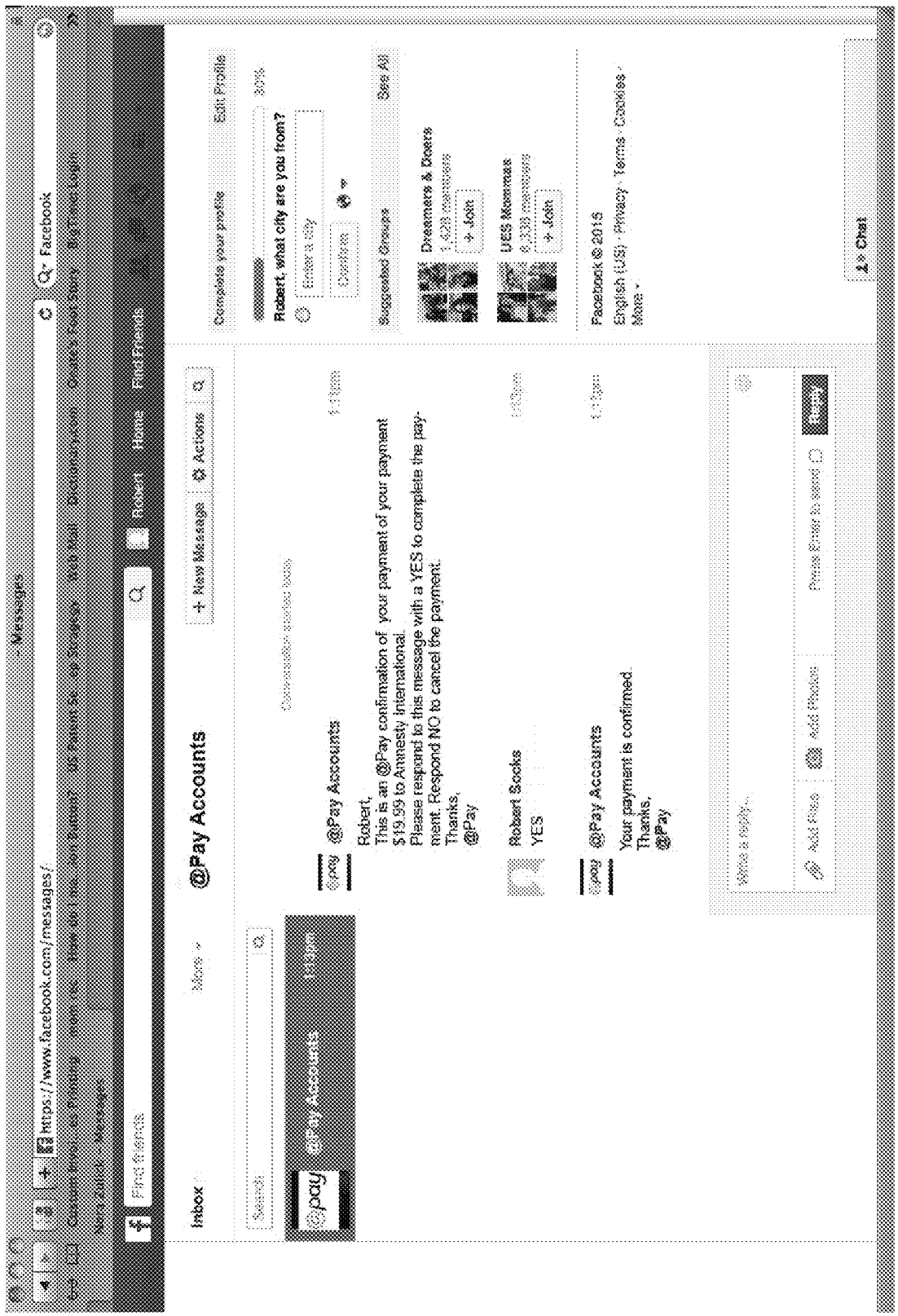
FIG. 10 is an illustration of an example of a social media message confirmation a customer device for viewing browser windows.

FIG. 8 is a transactional flow diagram that describes the process for using SMS messages and/or social media posts as a confirmation of email-based payment. The vendor system 802 requests a token (804) from the e-commerce system 803 for inclusion in an email message. The e-commerce system 803 generates a token (805) and shares it (806) with the vendor 802. The vendor 802 may acquire the token by a URL based logon tool or integration with the @Pay application program interface (API). This process may be done by a third party such as an email service provider (ESP). The vendor 802 may include this token in a mailto link in an email (807) to the customer 801(*b*). The customer 801(*b*) may open the emails, select the mailto link, and generate a response email, which contains the token (808). The token may be located in any field and the message is addressed to the e-commerce system 803. The customer 801(*b*) may send the email (809) and the e-commerce system 803, which receives the email, may authenticate the email address and decode the token (810). The e-commerce system 803 may perform a presale hook and look up information, recognizing the requirement for a confirmation message format. An example of this may be an SMS message addressed to the customer's phone number. The e-commerce system 803 may send this message (811) to the phone customer's phone number 801(*a*). FIG. 9 is an example of an SMS message and the response on a customer's device. The SMS message may ask the customer to simply text a 'YES' or 'NO' response in order to allow the transaction, may not require any response, or may only require a response to the negative or positive. The confirmation method may have the details of the transaction. FIG. 10 is an example of a confirmation message being sent to a social media account. In the example where a response message is required the customer may respond by texting back "YES" to confirm the amount (812) or, for added security, there may be a predetermined PIN number known only to the account holder and the e-commerce system. The customer 801(*a*) may respond (813) and the e-commerce system 803 may authenticate the message and decode the token (814). The confirmation message is processed by the email e-commerce system 803 and the payment is processed.

This system may also be used when signing up or when changing information within an account. The e-commerce system may send an email SMS or social media message each time a customer's account is accessed.

In another embodiment, the SMS messages and/or social media posts may have a series of responses that address several different problems. For example, one may require the customer to message the word "YES" to confirm the order or require the customer to message the word "NO" to cancel the order. Another example may require the customer to message the word "Lock" if the customer believes the account has been breached. The "Locked" response triggers the e-commerce system to not process the payment and the account is frozen until the customer may be authenticated. If the customer does lock the account they may receive additional SMS messages and/or social media posts and emails describing how to access their account and reset the security password or may instruct them to cancel their payment method i.e. credit card, debit, bank account or direct carrier billing system.

In another embodiment the text message may have a mailto link or URL link included in the message and when selected either a confirmation or cancellation of the order occurs. In the case of a canceled order the customer may receive an email notification that the order was canceled based on a command from another media. The response to a locked or a canceled order may be based on the requirements of the vendor.

Situations may arise where a registered customer wishes to access their account page, but they may not have a password. The system and method described herein allow the email e-commerce system to authenticate a user without requiring a password prompt while improving user experience and increasing security.

Figure 11:
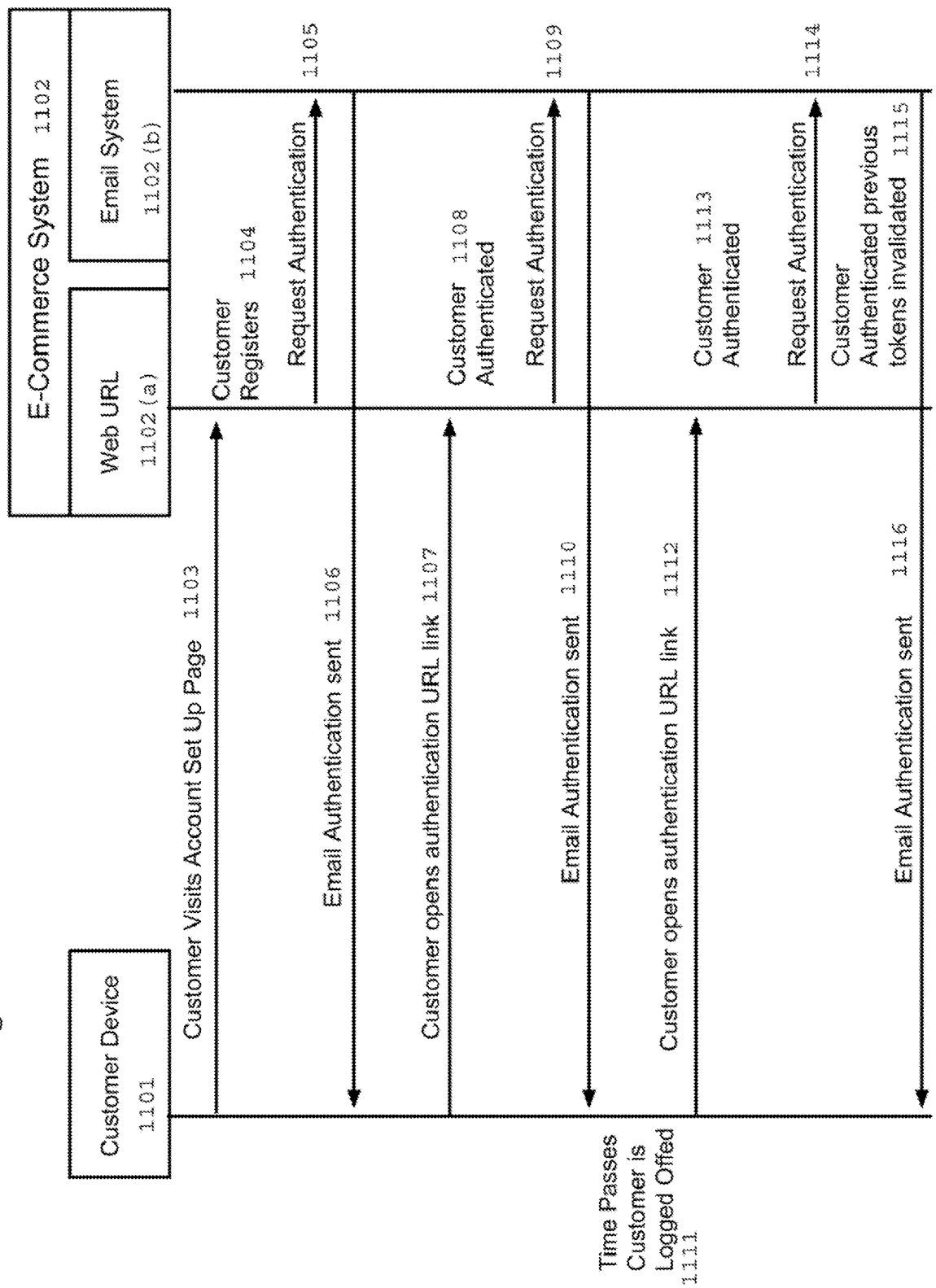
FIG. 11 is a transactional flow diagram that describes the process for authenticating a user for the e-commerce system and the delivery of the email with a token for the next time they wish to logon.

FIG. 11 shows a transactional flow diagram for a non-password based form of authentication. This diagram shows a method for the email e-commerce system 1102 to authenticate a registered customer 1101 by email. The customer 1101 may visit an account set up page (1102). The customer 1101 may register (1104) with the e-commerce system 1102. The e-commerce system's web URL 1102(*a*) may request authentication of the customer (1105) from the e-commerce system's email system. By presenting an email address to the e-commerce system, the e-commerce system 1102 may send an authentication token via an authentication email (1106) to the customer's 1101 email account if that customer has already registered.

Referring back to FIG. 4, this is an example of a sign up where a customer can opt into a non-password system. This token, when passed back (1107) to the e-commerce system 1102, authenticates that customer 1101 (1108) into the e-commerce system 1102. The e-commerce system 1102 delivers an additional authentication email upon successful login that invalidates any existing unused tokens and includes a new, valid token for the next time the customer must authenticate (1115) with the e-commerce system 1102. This email with the active authentication token may remain in the inbox of the user until the time comes when the user requires authentication. When the customer 1101 opens the email and selects the URL link the user is authenticated into the system. This process then repeats when the customer 1101 requires access to their account. If the customer cannot find or has deleted the last authentication email they can request another to be sent on the e-commerce website.

Alternatively or additionally, when the customer registers with the e-commerce system they provide the answers to the security questions. When the customer requires access to their account page they visit a URL page where they request an access-reset email be sent to their email address. The reset email holds a security question. The security question may appear in the email while the answer is required to be placed in the URL window. If the correct answer is input to the URL page, e-commerce system access is granted to the account.

Alternatively or additionally, the e-commerce system may be contingent on using the email client's structure password environment and the security information required on the customer's credit card. When the link is sent to the customer and the customer selects the link and opens the page the customer is prompted to submit part or all of their credit card information to access the account. The sending of the link to the email account may represent one level of access to the account, while the use of the credit card information may represent another level of access. For example, selecting the link within the email client may give access to shopping carts and deliver instructions, but payment changes require credit cards.

Alternatively or additionally a customer may opt into a non-password system that requires a confirmation by the customer from a media other than their email account. Referring back to FIG. 4, this is an example of a signup where a customer registers with the e-commerce system and chooses this option and the media they wish to use, for example, text messaging or social media.

Figure 12A:
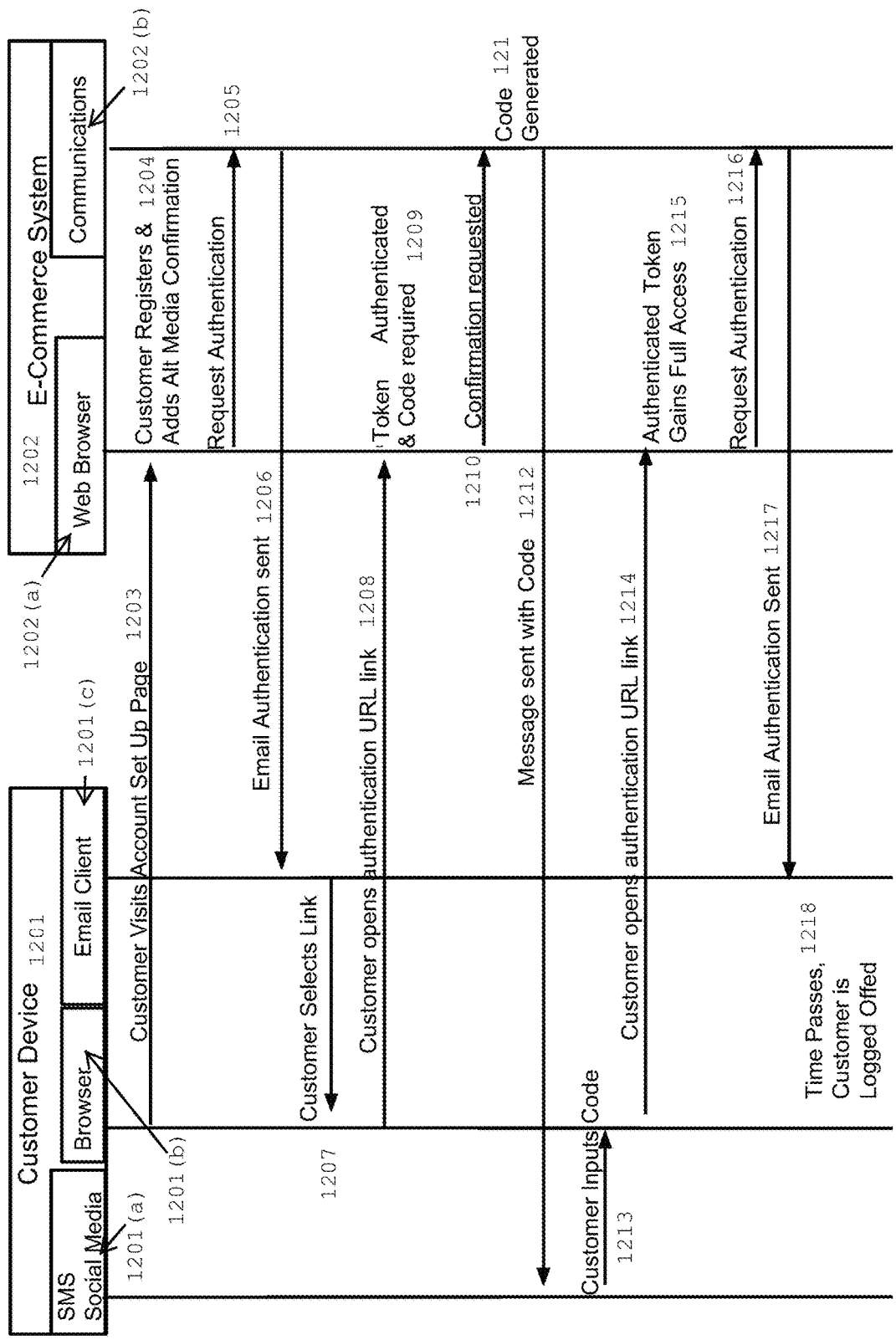
FIGS. 12A and 12B are transactional flow diagrams that describe the process for authenticating a user for the e-commerce system and the delivery of the email with a token for the next time they wish to logon with an added secret code messaged in an alternative media such as SMS or social media.
Figure 12B:
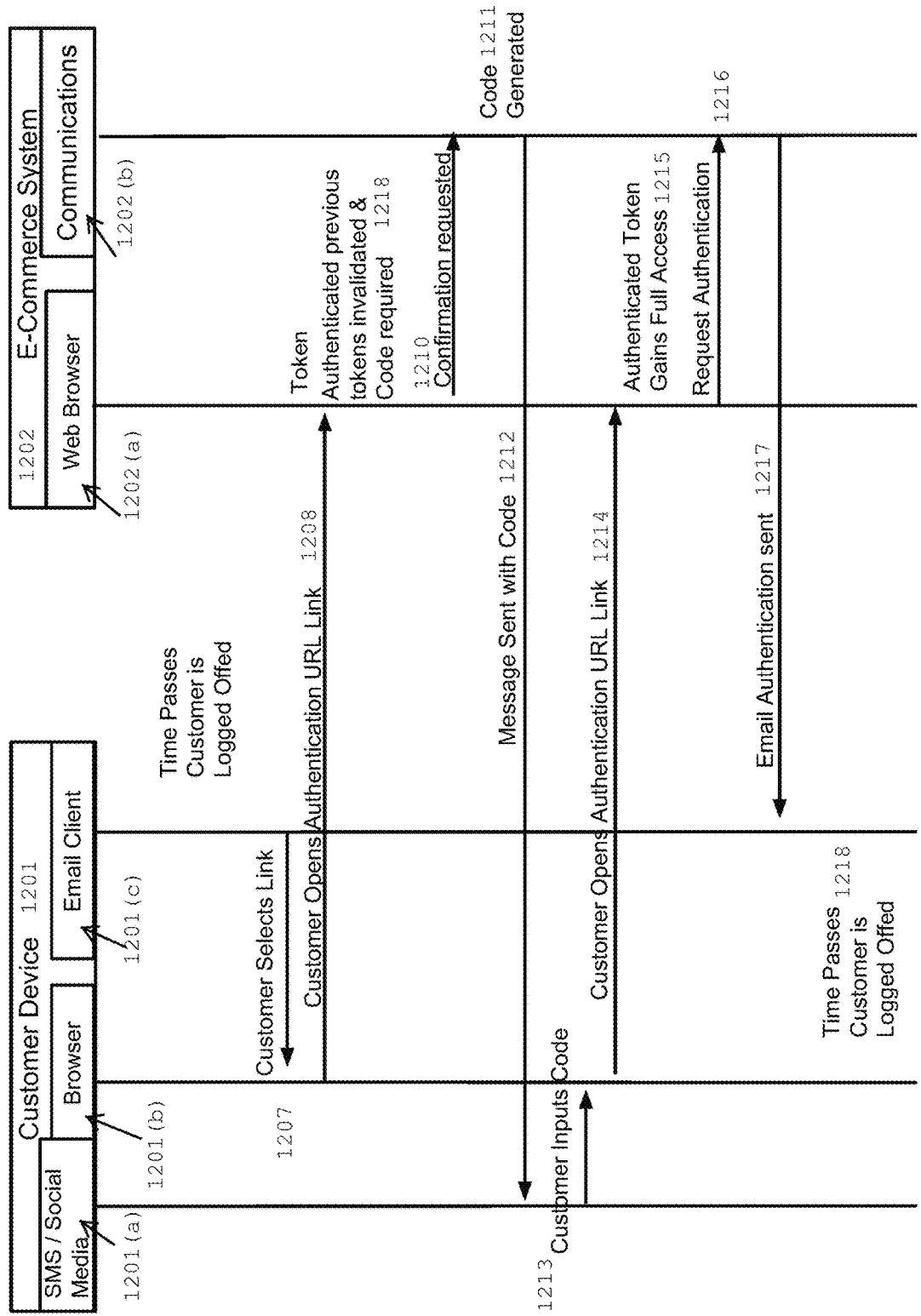

FIGS. 12A and 12B are a transactional flow diagram of a non-password system that requires a confirmation. A customer using the customer device 1201(*b*) may access, via a web browser (1203), the e-commerce sign up page and register (1204) with the e-commerce system 1202 supplying the e-commerce system 1202 with required information such as credit card information, email address and opting into a non-password based form of authentication. The client 1201 shares with the e-commerce system 1202 the address or phone number for the alternative media, such as SMS messaging or Facebook. The e-commerce system 201 may store this information in a library where it can be accessed by a pre-sale hook. Once the customer 1201 enters the required information, the e-commerce system web browser unit 1202(*b*) requests authentication by email with a token (1205). An authentication email and token are generated and sent to the customer's email address 1201(*c*) (1206). This email may contain a URL link containing the token. The customer 1201 selects the URL link (1207) and opens an authentication URL link (1208). The e-commerce system 1202 authenticates the token and opens a web page (1209). The web page requests that the customer check their alternative media for a code, which is required before moving completing authentication.

Figure 13:
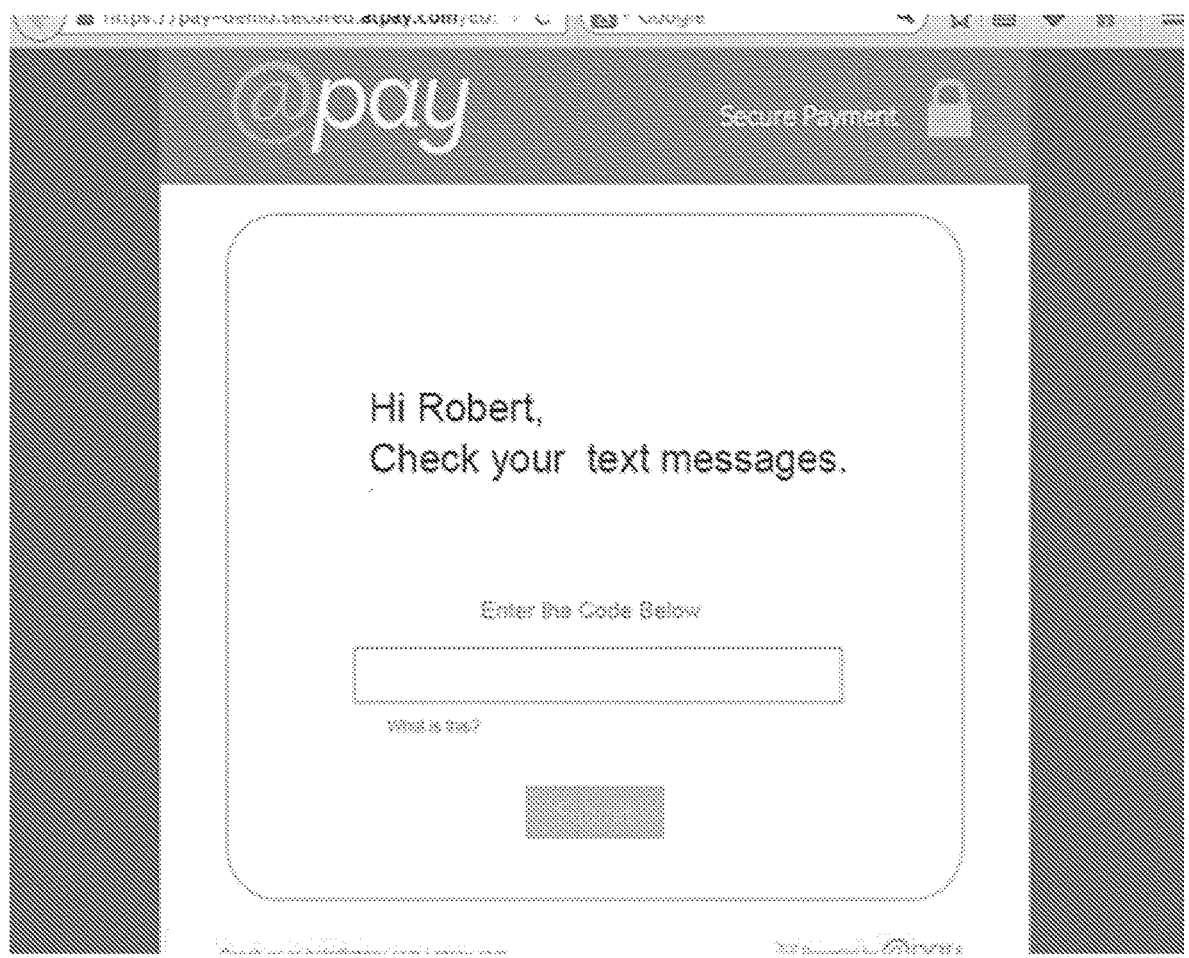
FIG. 13 is an example of the web URL the customer may input a code sent in a separate media.

FIG. 13 is an example of the web URL the customer would input a code. The e-commerce system 1202 generates a confirmation request from the communications unit (1210) and a message is generated with a random code in the message (1211). This message may also have a token. The message is sent to the customer 1201 (1212) and the customer views the code (1213) and inputs it into the URL Logon (1214).

Figure 14:
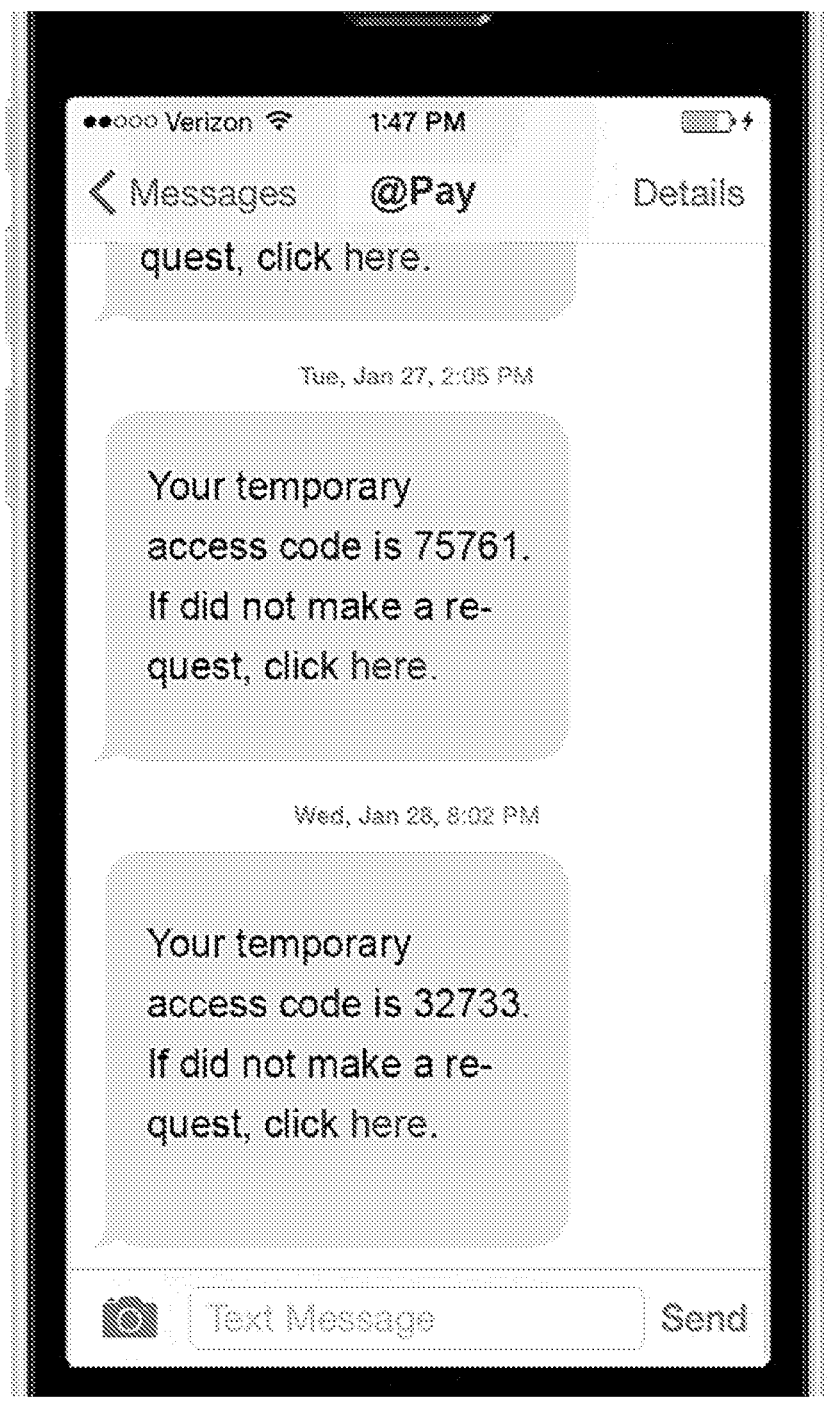
FIG. 14 is an example of a SMS with a code to input in the logon of a customer account.

FIG. 14 is an example of the code sent via SMS. If the code matches the customer is granted access (1215). The e-commerce system 1202 requests an authentication email with a token (1216) and generates an email addressed to the customer and token and sends it to the customer 1201 (1217). The authentication email is stored in the email client until the next time the customer needs to access their account. In FIG. 12B the process of FIG. 12A is repeated, however, once the customer 1201 has logged-on, the e-commerce system 1202 invalidates the previous authentication tokens (1218).

Alternatively or additionally since the above-described methods possess two methods of confirmation, one with an authentication email and a link and another with a code sent to another media, there may be multiple levels of security. The e-commerce system may allow limited access to the account details based on email authentication or based on the confirmation code. For example, a customer may only need to view the contents of a shopping cart and that may only require an email authentication, while a change of address requires full authentication. These levels may be combined with the added security of knowledge of the credit card information.

The above examples use a customer relationship as the sample for the security measures, however, these methods may be applied to vendors or other third party relationships. The financial transactions are described as credit card processing but may be a banking system, gift card provider or alternative currency.

Figure 15:
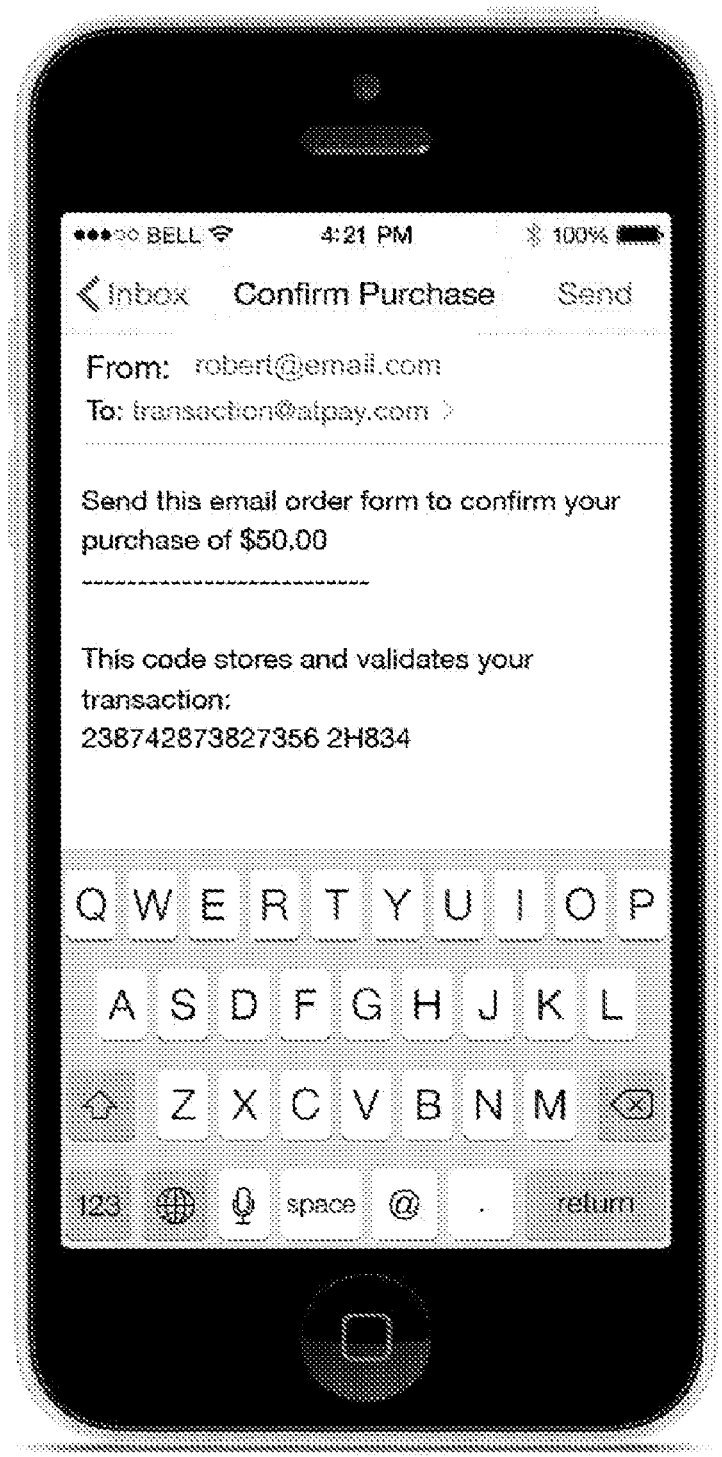
FIG. 15 shows a smartphone that may be used to implement features described above.

FIG. 15 shows an example wherein the customer device 150 of FIG. 1 is a smartphone that may be used to implement features described above. The mobile phone may include a processor, memory, communication interface, peripheral device interface, and a touch screen display. The smartphone may perform the email checkout methods described herein.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or Blu-ray-Disc, or other type of device for electronic data storage.

Although the methods and features described above with reference to FIGS. 2-5 are described above as performed using the example system 100 of FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-5 may be used alone without the other features and elements or in various combinations with or without other features and elements. Sub-elements of the methods and features described above with reference to FIGS. 1-5 may be performed in any arbitrary order (including concurrently), in any combination or sub combination.

What is claimed is:

1. A method improving security of a computer network by restricting access to a secure webpage utilizing Simple Mail Transfer Protocol (SMTP), the method comprising:
   receiving an authentication request, wherein the authentication request includes a request to access an authentication Uniform Resource Location (URL) that is associated with the secure webpage;
   generating a link to the authentication URL, wherein the link contains a new authentication token;
   transmitting, using SMTP, an authentication message to a registered user, wherein the authentication message includes the link to the authentication URL;
   receiving a request to access the authentication URL in response to activation of the link, wherein the request to access the authentication URL includes the new authentication token;
   granting access to the secure webpage associated with the authentication URL based on the new authentication token received, wherein access to the secure webpage requires a valid authentication token; and
   invalidating any authentication tokens associated with the registered user other than the new authentication token in response to the granting access to the secure webpage associated with the authentication URL thereby restricting the access to the secure webpage to only the new authentication token.

2. The method of claim 1, wherein the authentication request is generated upon customer submitting an email address on a website.

3. The method of claim 1, wherein the authentication request is received as an email message, Short Message Service (SMS) message or social media message.

4. The method of claim 1, further comprising:
   registering a user as the registered user via a web page.

5. The method of claim 1, further comprising:
   invalidating the new authentication token after a predetermined period of time has elapsed since the secure webpage associated with the authentication URL was accessed.

6. The method of claim 1, further comprising:
   on a condition that access to the secure webpage associated with the authentication URL is not granted:
   transmitting, using SMTP, the authentication message to the registered user.

7. The method of claim 1, wherein the secure webpage associated with the authentication URL enables payment of an e-commerce transaction.

8. An apparatus for improving security of a computer network by restricting access to a secure webpage utilizing Simple Mail Transfer Protocol (SMTP), the apparatus comprising:
   a network interface that is communicatively coupled to a server and a client device via network;
   a memory;
   a processor that is communicatively coupled to the network interface and the memory; wherein the processor is configured to:
   receive, using the network interface, an authentication request, wherein the authentication request includes a request to access an authentication Uniform Resource Location (URL) that is associated with the secure webpage;
   generate a link to the authentication URL, wherein the link contains a new authentication token;
   transmit, using the network interface, an authentication message to a registered user via SMTP, wherein the authentication message includes the link to the authentication URL;
   receive a request to access the authentication URL in response to activation of the link, wherein the request to access the authentication URL includes the new authentication token,
   grant access to the secure webpage associated with the authentication URL that is hosted by the server based on the new authentication token received, wherein access to the secure webpage requires a valid authentication token; and on a condition that access to the secure webpage associated with the authentication URL is granted:

invalidate any authentication tokens associated with the registered user other than the new authentication token thereby restricting the access to the secure webpage to only the new authentication token.

9. The apparatus of claim 8, wherein the authentication request is generated upon customer submitting an email address on a website.

10. The apparatus of claim 8, further comprising:
wherein the authentication request is received as an email message, Short Message Service (SMS) message or social media message.

11. The apparatus of claim 8, wherein the processor is further configured to:
receive, using the network interface, a registration of a user, wherein the registration is performed a web page, and
identify the user as the registered user.

12. The apparatus of claim 8, wherein the processor is further configured to:
invalidate the new authentication token after a predetermined period of time has elapsed since the secure webpage associated with the authentication URL was accessed.

13. The apparatus of claim 8, wherein the processor is further configured to:
on a condition that access to the secure webpage associated with the authentication URL is not granted:
transmit, using the network interface, the authentication message to the registered user utilizing SMTP.

14. The apparatus of claim 8, wherein the secure webpage associated with the authentication URL enables payment of an e-commerce transaction.

15. A non-transitory computer readable storage medium that stores instructions for improving security of a computer network by restricting access to a secure webpage utilizing Simple Mail Transfer Protocol (SMTP), the instructions when executed by a processor cause the processor to execute a method, the method comprising:
receiving, using a network interface, an authentication request, wherein the authentication request includes a request to access an authentication Uniform Resource Location (URL) that is associated with the secure webpage;

generating a link to the authentication URL, wherein the link contains a new authentication token;

transmitting, using the network interface, an authentication message to a registered user utilizing SMTP, wherein the authentication message the link to the authentication URL;

receiving a request to access the authentication URL in response to activation of the link, wherein the request to access the authentication URL includes the new authentication token;

granting access to the secure webpage associated with the authentication URL based on the new authentication token received, wherein access to the secure webpage requires a valid authentication token; and invalidating any authentication tokens associated with the registered user other than the new authentication token in response to the granting access to the secure webpage associated with the authentication URL thereby restricting the access to the secure webpage to only the new authentication token.

16. The non-transitory computer readable storage medium of claim 15, wherein the authentication request is received as an email message, Short Message Service (SMS) message or social media message.

17. The non-transitory computer readable storage medium of claim 15, wherein the method further comprises: o:
invalidating the new authentication token after a predetermined period of time has elapsed since the secure webpage associated with the authentication URL was accessed.

18. The non-transitory computer readable storage medium of claim 15, wherein the method further comprising:
on a condition that access to the secure webpage associated with the authentication URL is not granted:
transmit, using the network interface, the authentication message to the registered user utilizing SMTP.

19. The method of claim 1, further comprising:
transmitting, using SMTP, an authentication confirmation message to the registered user in response to the granting access to the secure webpage associated with the authentication URL.

20. The apparatus of claim 8, wherein the processor is further configured to:
transmit, using the network interface, an authentication confirmation message to the registered user utilizing SMTP when access to the secure webpage associated with the authentication URL is granted.

\* \* \* \* \*